US012641395B2

(12) United States Patent
Raj et al.

(10) Patent No.: US 12,641,395 B2
(45) Date of Patent: May 26, 2026

(54) WI-FI POSITIONING BASED CONTACT TRACING

(71) Applicant: QUALCOMM Incorporated, San Diego, CA (US)

(72) Inventors: Rishabh Raj, Jamshedpur (IN); Xiaoxin Zhang, Sunnyvale, CA (US); Ravindra Chauhan, Chengalpattu (IN)

(73) Assignee: QUALCOMM Incorporated, San Diego, CA (US)

( * ) Notice: Subject to any disclaimer, the term of this patent is extended or adjusted under 35 U.S.C. 154(b) by 443 days.

(21) Appl. No.: 18/043,643

(22) PCT Filed: Sep. 22, 2021

(86) PCT No.: PCT/US2021/051421
§ 371 (c)(1),
(2) Date: Mar. 1, 2023

(87) PCT Pub. No.: WO2022/081315
PCT Pub. Date: Apr. 21, 2022

(65) Prior Publication Data
US 2023/0276198 A1      Aug. 31, 2023

(30) Foreign Application Priority Data

Oct. 16, 2020      (IN) .............................. 202041045195

(51) Int. Cl.
*H04W 4/029*      (2018.01)
*H04W 4/02*      (2018.01)
(52) U.S. Cl.
CPC ........... *H04W 4/029* (2018.02); *H04W 4/023* (2013.01)

(58) Field of Classification Search
CPC ....... H04W 4/029; H04W 4/023; H04W 4/80; H04W 24/08; H04W 72/1215;
(Continued)

(56) References Cited

U.S. PATENT DOCUMENTS

| | | | |
|---|---|---|---|
| 2006/0099969 A1 | 5/2006 | Staton et al. | |
| 2007/0287473 A1 | 12/2007 | Dupray | |
| 2011/0258313 A1* | 10/2011 | Mallik ................... | H04W 8/005 |
| | | | 709/224 |
| 2014/0320309 A1* | 10/2014 | Zhang ....................... | H04Q 9/00 |
| | | | 340/870.07 |

(Continued)

FOREIGN PATENT DOCUMENTS

| | | |
|---|---|---|
| CN | 111405470 A | 7/2020 |
| CN | 111629339 A | 9/2020 |

(Continued)

OTHER PUBLICATIONS

International Search Report and Written Opinion—PCT/US2021/051421—ISA/EPO—Aug. 3, 2022.

(Continued)

*Primary Examiner* — Fred A Casca
(74) *Attorney, Agent, or Firm* — Thien T. Nguyen

(57)      ABSTRACT
Techniques are provided for utilizing Wi-Fi positioning based contact tracing. An example method for reporting signal measurements to a contact tracing network includes activating a contact tracing application on a user equipment based on a proximity to the contact tracing network, receiving one or more measurement signals from a station in the contact tracing network, and reporting a signal measurement and station identification to a network entity.

26 Claims, 22 Drawing Sheets

(58) Field of Classification Search
CPC ...... G16H 50/80; G16H 50/00; G01S 5/0205;
G01S 5/02521; H04B 17/254
See application file for complete search history.

(56) References Cited

U.S. PATENT DOCUMENTS

| | | | |
|---|---|---|---|
| 2018/0206274 A1 | | 7/2018 | Cherian et al. |
| 2018/0324548 A1* | | 11/2018 | Venkatraman ........ H04W 76/14 |
| 2019/0075538 A1 | | 3/2019 | Bar-Shalom et al. |
| 2019/0124511 A1* | | 4/2019 | Sirotkin .............. H04W 12/069 |
| 2019/0140709 A1* | | 5/2019 | Guerra ................. H04B 7/0452 |
| 2021/0289319 A1* | | 9/2021 | Antony ..................... G06F 8/65 |

FOREIGN PATENT DOCUMENTS

| | | |
|---|---|---|
| GB | 2467631 A | 8/2010 |
| KR | 20200047457 A | 5/2020 |
| WO | 0195056 A2 | 12/2001 |
| WO | WO-2018204002 A1 | 11/2018 |
| WO | 2021062484 A1 | 4/2021 |

OTHER PUBLICATIONS

McLachlan S., et al., "Bluetooth Smart phone Apps: Are they the Most Private and Effective Solution for COVID-19 Contact Tracing?", arxiv.org, Cornell University Library, 201 OLIN Library Cornell University Ithaca, NY 14853, May 8, 2020 (May 8, 2020), XP081673410, 20 Pages, The Whole Document.
Nguyen C.T., et al., "Enabling and Emerging Technologies for Social Distancing: A Comprehensive Survey", Arxiv.Org, Cornell University Library, 201 OLIN Library Cornell University, Ithaca, NY, 14853, May 2, 2020, pp. 1-43, XP081669627.
Partial International Search Report—PCT/US2021/051421—ISA/EPO—Apr. 8, 2022.

* cited by examiner

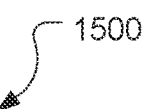
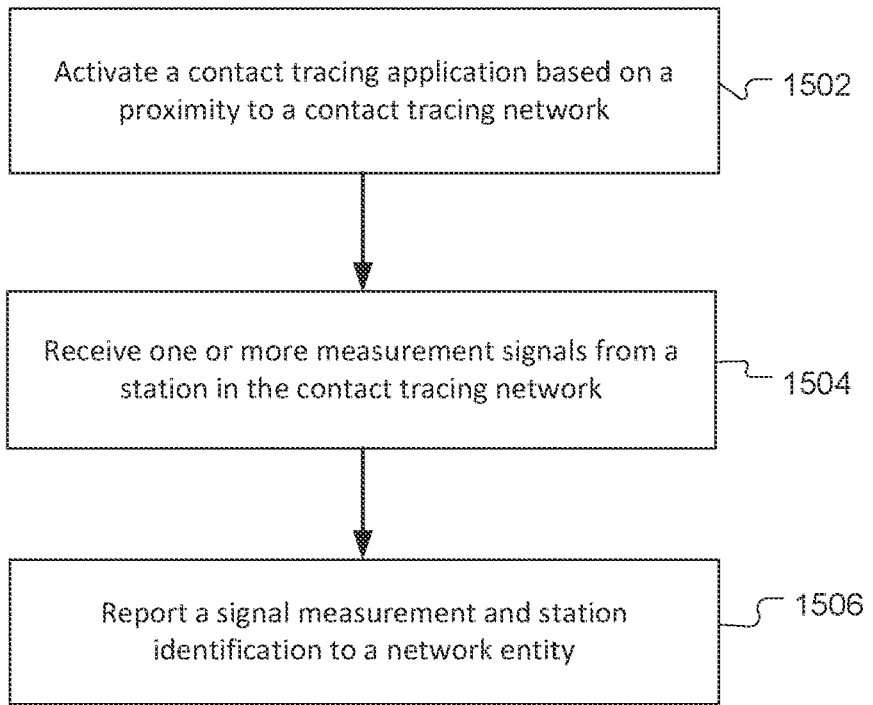
1500
Activate a contact tracing application based on a proximity to a contact tracing network — 1502
Receive one or more measurement signals from a station in the contact tracing network — 1504
Report a signal measurement and station identification to a network entity — 1506
*FIG. 15*

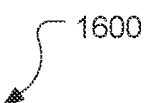
1600
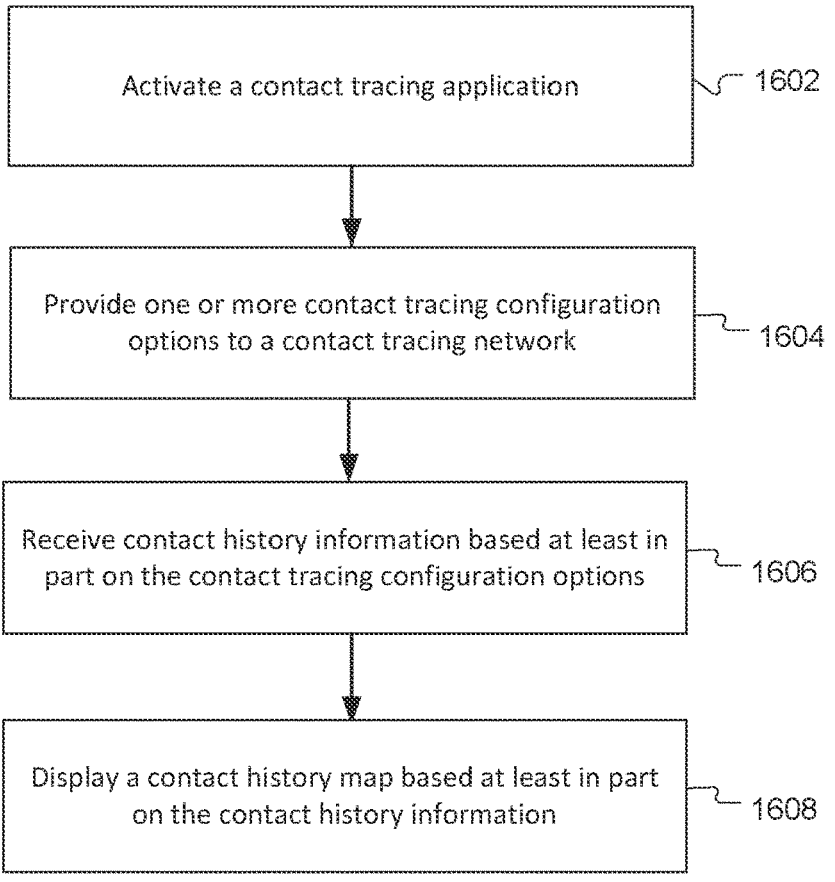
Activate a contact tracing application — 1602
Provide one or more contact tracing configuration options to a contact tracing network — 1604
Receive contact history information based at least in part on the contact tracing configuration options — 1606
Display a contact history map based at least in part on the contact history information — 1608
*FIG. 16*

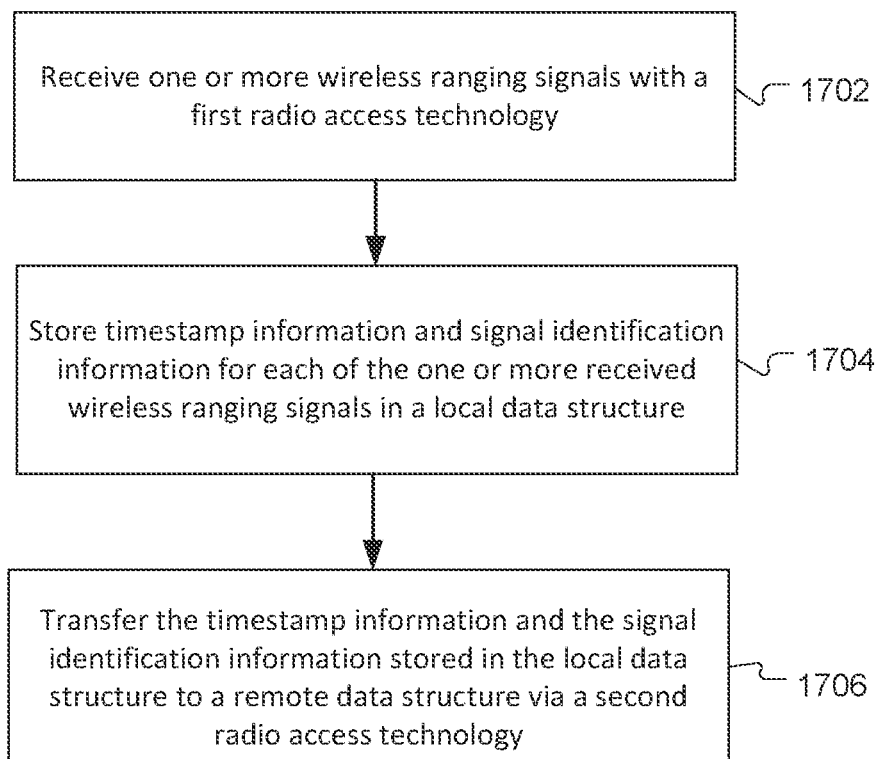

1700

Receive one or more wireless ranging signals with a first radio access technology ⟋ 1702

Store timestamp information and signal identification information for each of the one or more received wireless ranging signals in a local data structure ⟋ 1704

Transfer the timestamp information and the signal identification information stored in the local data structure to a remote data structure via a second radio access technology ⟋ 1706

*FIG. 17*

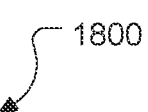
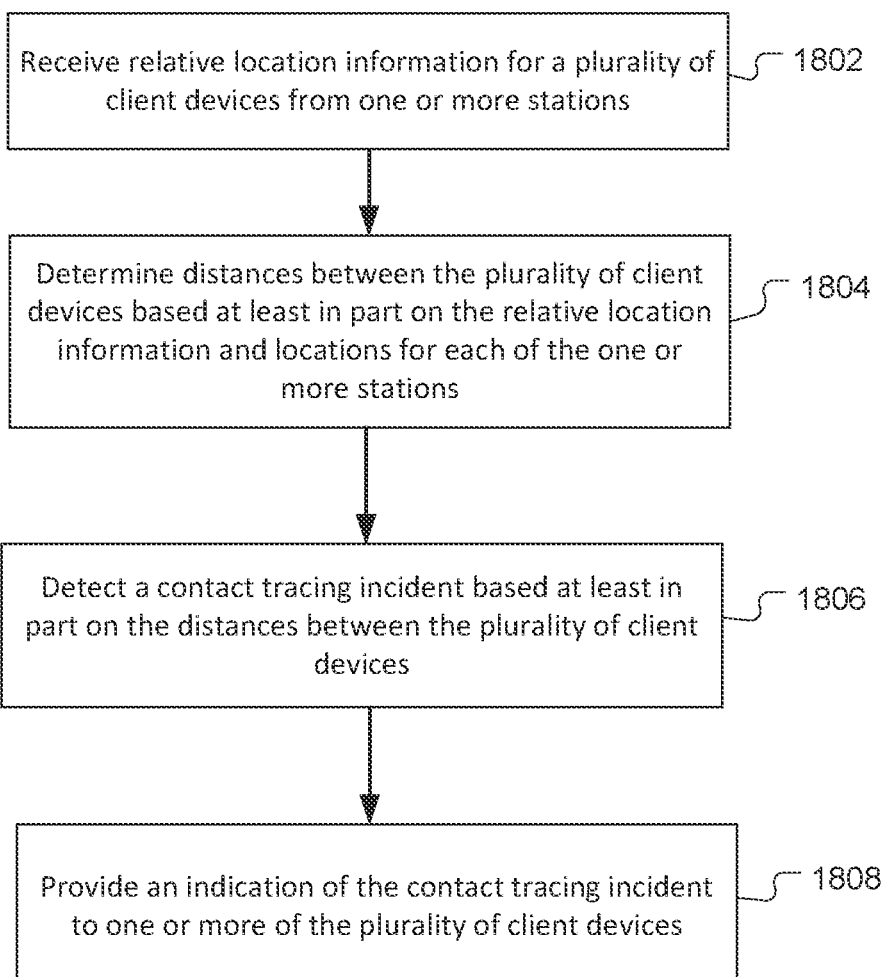
*FIG. 18*

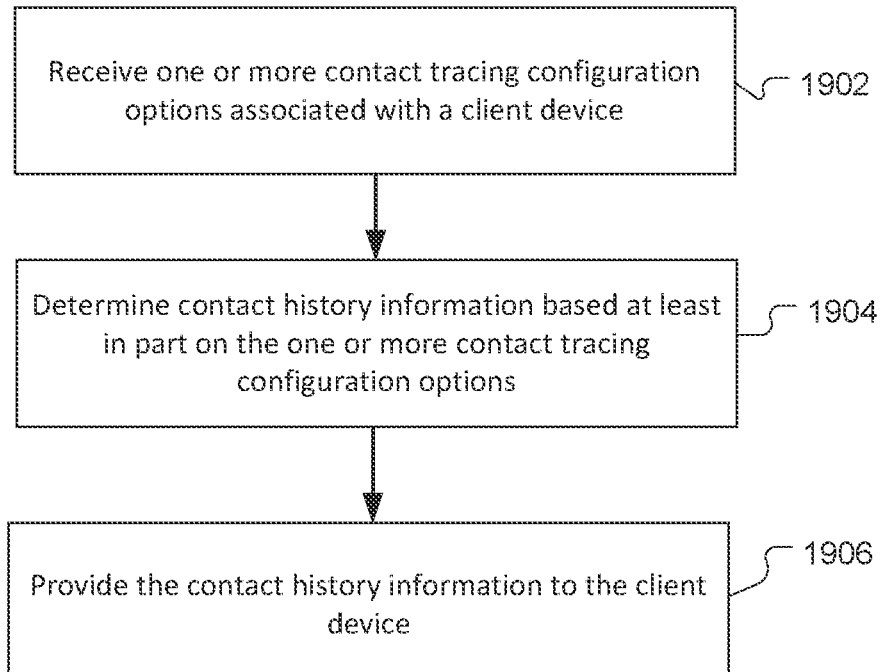
Receive one or more contact tracing configuration options associated with a client device — 1902
Determine contact history information based at least in part on the one or more contact tracing configuration options — 1904
Provide the contact history information to the client device — 1906
*FIG. 19*

WI-FI POSITIONING BASED CONTACT TRACING

CROSS-REFERENCE TO RELATED APPLICATIONS

This application is the National Stage of International Application No. PCT/US2021/051421, filed Sep. 22, 2021, entitled "WI-FI POSITIONING BASED CONTACT TRACING," which claims the benefit of Indian Patent Application number 202041045195, filed Oct. 16, 2020, entitled "WI-FI POSITIONING BASED CONTACT TRACING," both of which are assigned to the assignee hereof, and the entire contents of which are hereby incorporated herein by reference for all purposes.

BACKGROUND

Contact tracing is a technique for identifying and monitoring individuals who may have had contact with an infectious person and may be implemented as a means of controlling the spread of a communicable disease. Wireless communication systems have been used to assist governments and private organizations to implement contact tracing on a large scale. For example, mobile devices such as smart phones, smart watches, tablets, and other such user equipment may be used to determine location histories of users as well as to inform a user that they may have been exposed to a communicable disease so they may monitor their health for signs and symptoms of the disease. Such location based contact tracing techniques, however, may prompt privacy concerns for some users which may inhibit adoption of the technology. Further, the correlation of location data to infection probabilities may have substantial variation due to environmental and other factors. There is a need to improve the effectiveness of mobile devices for contact tracing applications.

SUMMARY

An example method for reporting signal measurements to a contact tracing network according to the disclosure includes activating a contact tracing application on a user equipment based on a proximity to the contact tracing network, receiving one or more measurement signals from a station in the contact tracing network, and reporting a signal measurement and station identification to a network entity.

Implementations of such a method may include one or more of the following features. An association process between the user equipment and the station may be performed in the contact tracing network. The user equipment may be a low power user equipment. The one or more measurement signals may include one or more round trip time (RTT) messages transmitted between the station and the user equipment. The one or more round trip time (RTT) messages may be Wi-Fi ranging frames including at least one of Fine Timing Measurement frames. Ranging Null Data Packet (NDP) frames, and Trigger Based (TB) ranging NDP frames. The one or more measurement signals may include sounding packets transmitted between two or more stations in the contact tracing network. The one or more measurement signals may be received via a first radio access technology and the reporting the signal measurement and station identification may utilize a second radio access technology. The first radio access technology may be a Wi-Fi network, and the second radio access technology may be a cellular network, Bluetooth®, or may utilize a radio frequency identification band. A contact tracing verification screen may be displayed when the contact tracing application is activated. The method may include determining a received signal strength indication based on the one or more measurement signals, and reporting the received signal strength indication to the network entity, and/or receiving an angle of arrival indication based on the one or more measurement signals, and reporting the angle of arrival indication to the network entity.

An example method for displaying a contact history map on a user equipment according to the disclosure includes activating a contact tracing application on the user equipment, providing one or more contact tracing configuration options to a contact tracing network, receiving contact history information based at least in part on the one or more contact tracing configuration options, and displaying the contact history map based at least in part on the contact history information.

Implementations of such a method may include one or more of the following features. Providing the one or more contact tracing configuration options may include performing an association process with a station in the contact tracing network and providing the one or more contact tracing configuration options to the station. The contact history information may be received from the station. The one or more contact tracing configuration options may be provided to the contact tracing network via a cellular network, and the contact history information may be received via the cellular network. The one or more contact tracing configuration options may include one or more of a social distance threshold value, a contact time threshold value, a cluster range value, and a cluster time value. The contact history information may include a location information associated with user equipment currently detected by the contact tracing network. The contact history information may include a location information associated with user equipment previously detected by the contact tracing network. The contact history information may include one or more social distancing violation objects indication an area covered by the contact tracing network where contact tracing incidents have occurred. The one or more social distancing violation objects may include a count value indicating a number of contact tracing incidents that occurred the area. The one or more contact tracing configuration options may include a validation code that is associated with the contact tracing network and required to receive the contact history information, An apparatus according to the disclosure includes a memory, at least one receiver, at least one transmitter, at least one processor communicatively coupled to the memory, the at least one receiver, the at least one transmitter, and configured to activate a contact tracing application based on a proximity to a contact tracing network, receive one or more measurement signals from a station in the contact tracing network, and report a signal measurement and station identification to a network entity.

Implementations of such an apparatus may include one or more of the following features. The at least one processor may be further configured to perform an association process between the apparatus and the station in the contact tracing network. The apparatus may be a low power user equipment. The one or more measurement signals may include one or more round trip time (RTT) messages transmitted to and received from the station. The one or more round trip time (RTT) messages may be Wi-Fi ranging frames including at least one of Fine Timing Measurement frames, ranging NDP frames, and TB ranging NDP frames. The one or more measurement signals may include sounding packets transmitted between two or more stations in the contact tracing network. The one or more measurement signals may be received via a first radio access technology and the reporting the signal measurement and station identification utilizes a second radio access technology. The first radio access technology may be a network, and the second radio access technology is a cellular network, Bluetooth, or may utilize a radio frequency identification band. The apparatus may include a display communicatively coupled to the at least one processor and the memory, such that the at least one processor is configured to display a contact tracing verification screen when the contact tracing application is activated. The at least one processor may be further configured to determine a received signal strength indication based on the one or more measurement signals, and report the received signal strength indication to the network entity. The at least one processor may be further configured to receiving an angle of arrival indication based on the one or more measurement signals, and reporting the angle of arrival indication to the network entity.

An example apparatus according to the disclosure includes a memory, a display device, at least one transceiver, at least one processor communicatively coupled to the memory, the display device, the at least one transceiver, and configured to activate a contact tracing application, provide one or more contact tracing configuration options to a contact tracing network, receive contact history information based at least in part on the one or more contact tracing configuration options, and display a contact history map on the display device based at least in part on the contact history information.

Implementations of such an apparatus may include one or more of the following features. The at least one processor may be further configured perform an association process with a station in the contact tracing network and provide the one or more contact tracing configuration options to the station. The at least one processor may be configured to receive contact history information from the station. The at least one processor may be further configured to provide the one or more contact tracing configuration options to the contact tracing network via a cellular network, and receive the contact history information via the cellular network. The one or more contact tracing configuration options may include one or more of a social distance threshold value, a contact time threshold value, a cluster range value, and a cluster time value. The contact history information may include a location information associated with user equipment currently detected by the contact tracing network. The contact history information may include a location information associated with user equipment previously detected by the contact tracing network. The contact history information may include one or more social distancing violation objects indication an area covered by the contact tracing network where contact tracing incidents have occurred. The one or more social distancing violation objects may include a count value indicating a number of contact tracing incidents that occurred the area. The one or more contact tracing configuration options may include a validation code that is associated with the contact tracing network and required to receive the contact history information.

An example apparatus for reporting signal measurements to a contact tracing network according to the disclosure includes means for activating a contact tracing application on a user equipment based on a proximity to the contact tracing network, means for receiving one or more measurement signals from a station in the contact tracing network,

4 and means for reporting a signal measurement and station identification to a network entity.

An example apparatus for displaying a contact history map on a user equipment according to the disclosure includes means for activating a contact tracing application on the user equipment, means for providing one or more contact tracing configuration options to a contact tracing network, means for receiving contact history information based at least in part on the one or more contact tracing configuration options, and means for displaying the contact history map based at least in part on the contact history information.

An example non-transitory processor-readable storage medium comprising processor-readable instructions configured to cause one or more processors to report signal measurements to a contact tracing network according to the disclosure includes code for activating a contact tracing application on a user equipment based on a proximity to the contact tracing network, code for receiving one or more measurement signals from a station in the contact tracing network, and code for reporting a signal measurement and station identification to a network entity.

An example non-transitory processor-readable storage medium comprising processor-readable instructions configured to cause one or more processors to display a contact history map on a user equipment according to the disclosure includes code for activating a contact tracing application on the user equipment, code for providing one or more contact tracing configuration options to a contact tracing network, code for receiving contact history information based at least in part on the one or more contact tracing configuration options, and code for displaying the contact history map based at least in part on the contact history information.

Items and/or techniques described herein may provide one or more of the following capabilities, as well as other capabilities not mentioned. A user equipment may detect a contact tracing network. The contact tracing network may be based on a Wi-Fi radio access technology. The relative location of the user equipment in the contact tracing network may be determined. Active or passive positioning techniques may be used. Contact tracing incidents with other user equipment may be determined based on the relative location information. The contact tracing network may be configured to generate contact incident reports and alerts. Contact tracing maps may be provided to users. The spread of a contagion may be identified based on the contact tracing incident data. Users may be able to avoid high risk areas based on the contact tracing maps. Other capabilities may be provided and not every implementation according to the disclosure must provide any, let alone all, of the capabilities discussed.

BRIEF DESCRIPTION OF THE DRAWINGS

FIG. 15 is a process flow for an example method for reporting signal measurements to a contact tracing network.

FIG. 16 is a process flow for an example method for displaying a contact history map.

FIG. 17 is a process flow for an example method for providing contact tracing information with low power user equipment.

FIG. 18 is a process flow for an example method of determining contact tracing incidents.

FIG. 19 is a process flow for an example method of providing contact history information to a user.

DETAILED DESCRIPTION

Techniques are discussed herein for utilizing Wi-Fi positioning based contact tracing. Contact tracing is the process of identifying, assessing, and managing people who have been exposed to a disease to prevent onward transmission. When systematically applied, contact tracing may be used to break the chains of transmission. Some organizations across are using Bluetooth (BT) based solutions for contact tracing. Such BT solutions, however, may have limited positioning accuracy caused by multipath reflections and other factors in indoor spaces. These inefficiencies may result in false positives or missed detections in wireless-based contact tracing. There is a need to improve the accuracy of contact tracing. In many use cases, such as in crowded public places like hospitals, shopping areas, public parks, airports, etc., Wi-Fi connections are available between access points (APs) in a network and clients. An AP network-based contact tracing solution by using technologies like RTT and/or AoA (when AP-to-client connections are available) may be used to improve contact tracing. These techniques and configurations are examples, and other techniques and configurations may be used.

Figure 1:
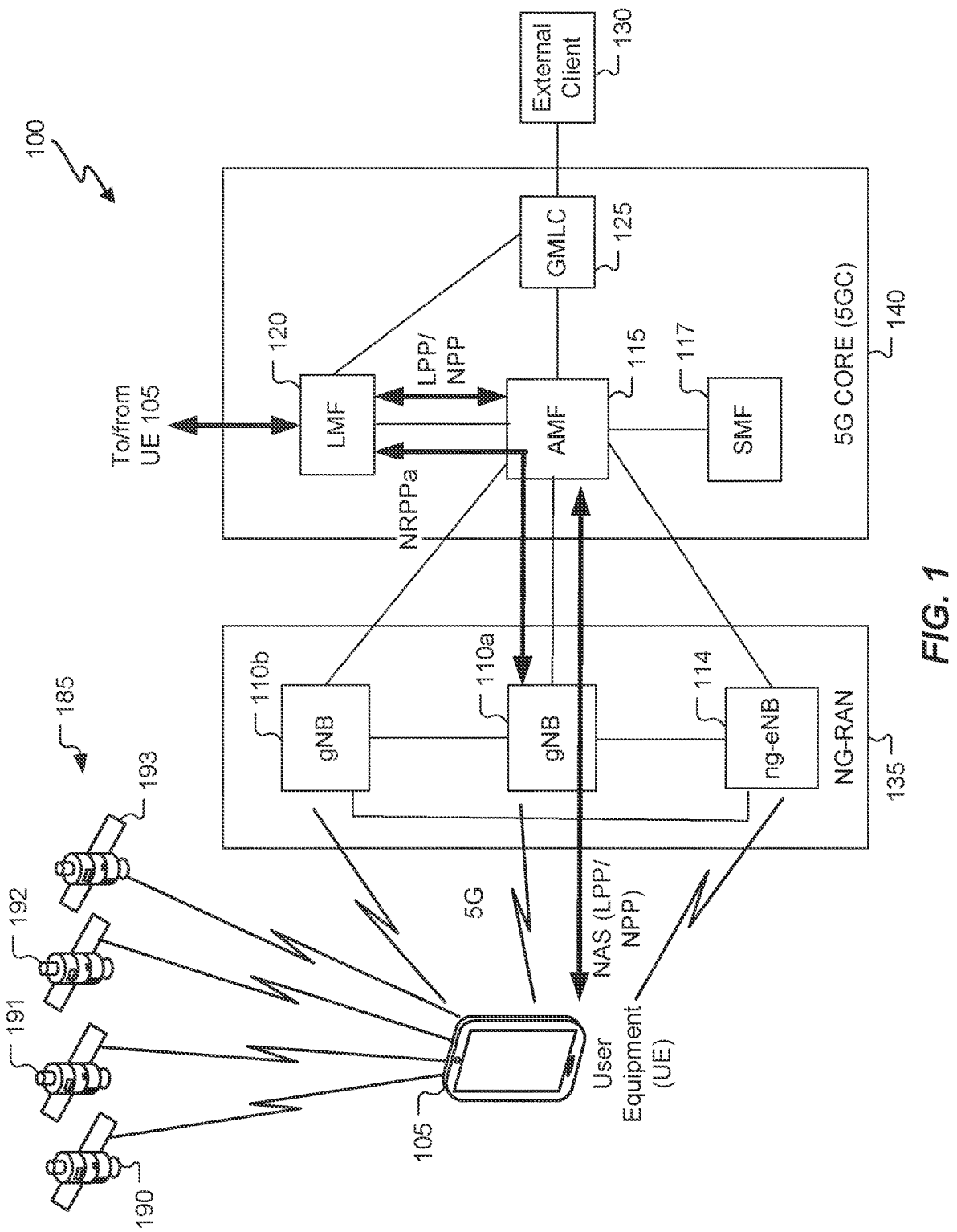
FIG. 1 is a simplified diagram of an example wireless communications system.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a location tracker device, a cellular telephone, or other device. A 5G network device may also be referred to as a New Radio (NR) network; NG-RAN 135 may be referred to as a 5G RAN or as an NR RAN; and 5GC 140 may be referred to as an NG Core network (NGC). Standardization of an NO-RAN and 5GC is ongoing in the 3$^{rd}$ Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (UPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to hi-directionally wirelessly communicate with the UE 105, and are each communicatively coupled to, and configured to bi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNo-deB) 114 and the gNBs (gNodeBs) 110a, 110b are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable, device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Bluetooth® (BT), Worldwide Interoperability for Microwave Access (WiMAX), 5G new radio (NR) using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UP 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UP 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UP, it is common to solve for local x, y, and possibly z coordinates and then, if desired; convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, 5G CV2X Sidelink, 5G ProSe, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1: M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, Hob in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved UE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs, such as the gNB 110a, the gNB 110b, ng-eNB 114, may each comprise one or more TRPs. For example, each sector within a cell of a BS may comprise a TRP, although multiple TRPs may share one or more components (e.g., share a processor but have separate antennas). The communication system 100 may include only macro TRPs or the communication system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a Pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an UE protocol or IEEE 802.11x protocol, may be used. For example, in an Evolved Packet System (EPS) providing UE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (IS) 38.455, NRPPa may be the same as, similar to, or an extension of the UE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP IS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, Hob, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message ma instruct the IX 105 to obtain one or more measurement quantities (e.g., beam ID, beam width, mean angle, RSRP, RSRQ measurements) of directional signals transmitted within particular cells supported by one or more of the gNBs 110a 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
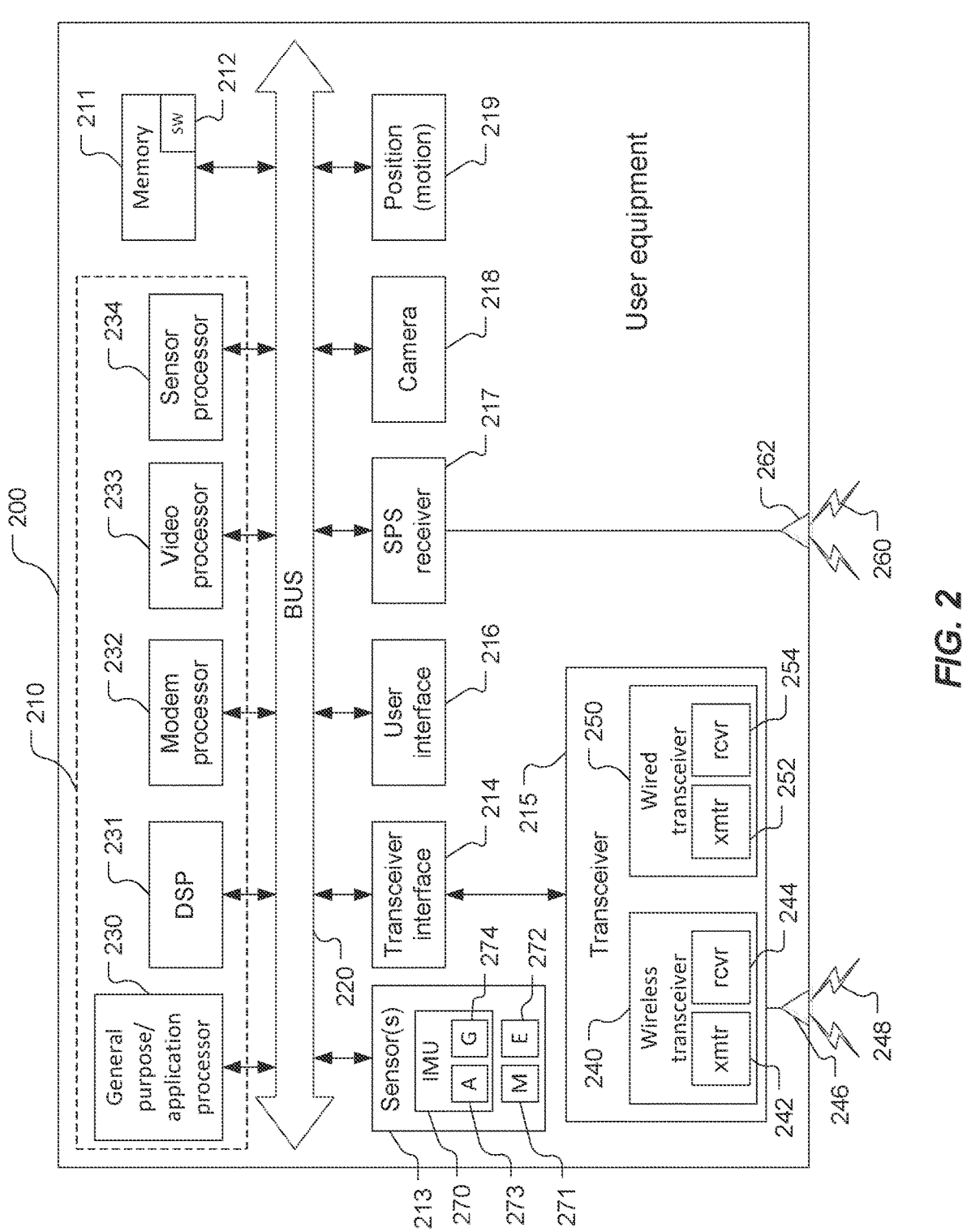
FIG. 2 is a block diagram of components of an example user equipment.

Referring also to FIG. 2, a UE 200 is an example of the UE 105 and comprises a computing platform including a processor 210, memory 211 including software (SW) 212, one or more sensors 213, a transceiver interface 214 for a transceiver 215, a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations. The sensors processing subsystem may be embedded in a low power core that facilitates continuous logging and derivation of sensor parameters required for high level functions such as temperature sensing, location assist or dead reckoning.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the IMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), V2C (Uu), IEEE 802.11 (including IEEE 802.11p), WiFi Direct (WiFi-D), Bluetooth®, Zigbee, 5G CV2X (Sidelink), 5G ProSe, etc. New Radio may use mm-wave frequencies and/or sub-6 GHz frequencies. The wired transceiver 250 may include a transmitter 252 and a receiver 254 configured for wired communication, e.g., with the NG-RAN 135 to send communications to, and receive communications from, the gNB 110a, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or m part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
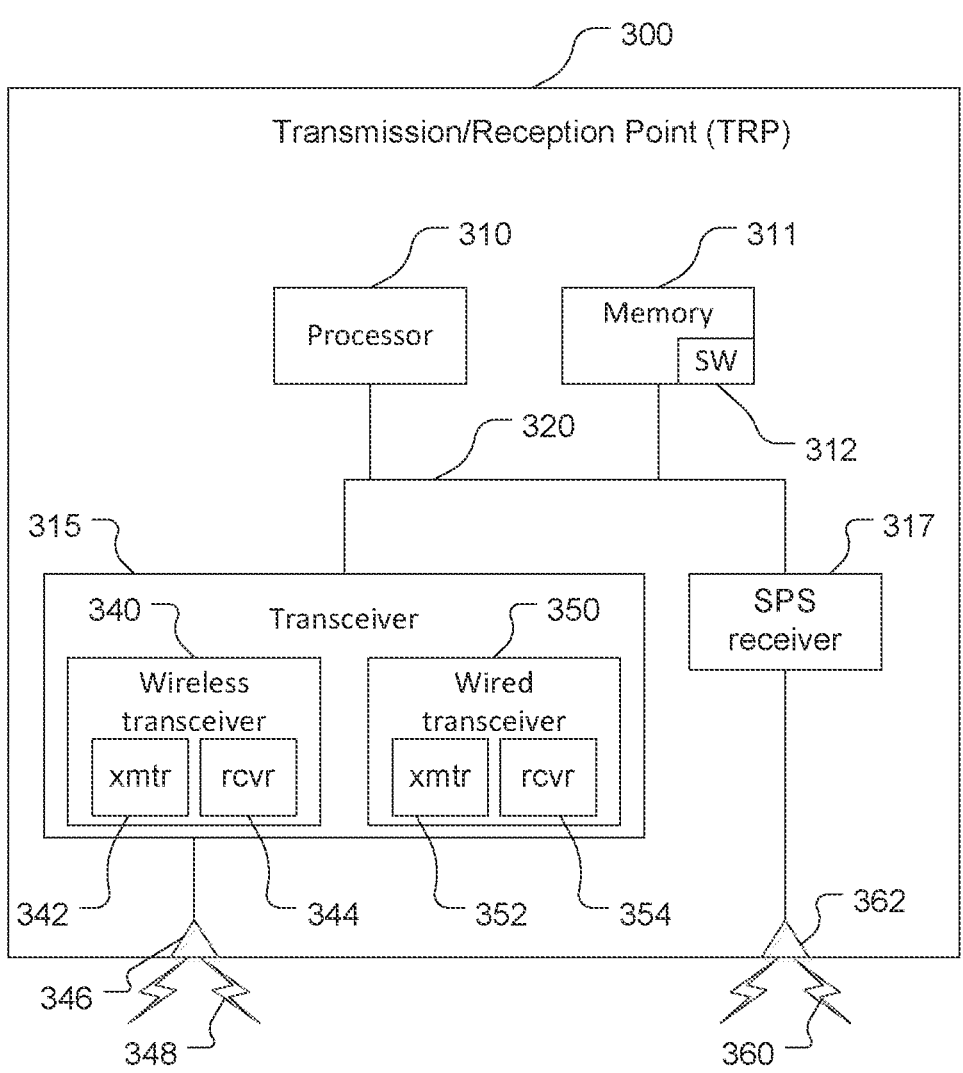
FIG. 3 is a block diagram of components of an example transmission/reception point.

Referring also to FIG. 3, an example of a TRP 300 of the gNB 110a, gNB 110b, ng-eNB 114 comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer only to the processor 310 performing a function, but this includes other implementations such as Where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the gNB 110a, gNB 110b, ng-BNB 114) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced. Mobile Phone System), CDMA (Code Division Multiple Access), WCDMA (Wideband CDMA), LTE (Long-Term Evolution), LTE Direct (LTE-D), 3GPP LTE-V2X (PCS), IEEE 802.11 (including IEEE 802.11p), WiFi Direct (WiFi-D), Bluetooth®, Zigbee etc. The wired transceiver 350 may include a transmitter 352 and a receiver 354 configured for wired communication, e.g., with the network 140 to send communications to, and receive communications from, the LMF 120 or other network server, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
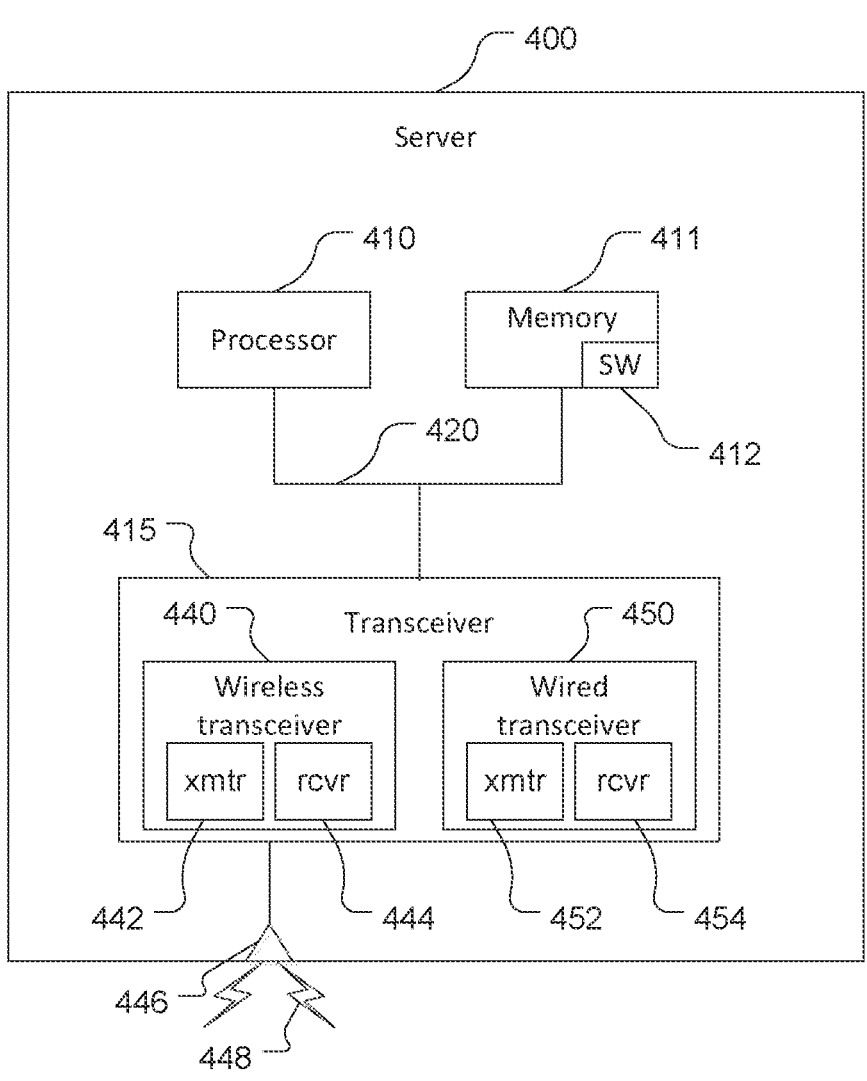
FIG. 4 is a block diagram of components of an example server.

Referring also to FIG. 4, an example server, such as the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the IMF 120) performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more uplink channels) and/or receiving (e.g., on one or more downlink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR). GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, Direct (WiFi-D), Bluetooth®, Zigbee etc. The wired transceiver 450 may include a transmitter 452 and a receiver 454 configured for wired communication, e.g., with the NG-RAN 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figure 5A:
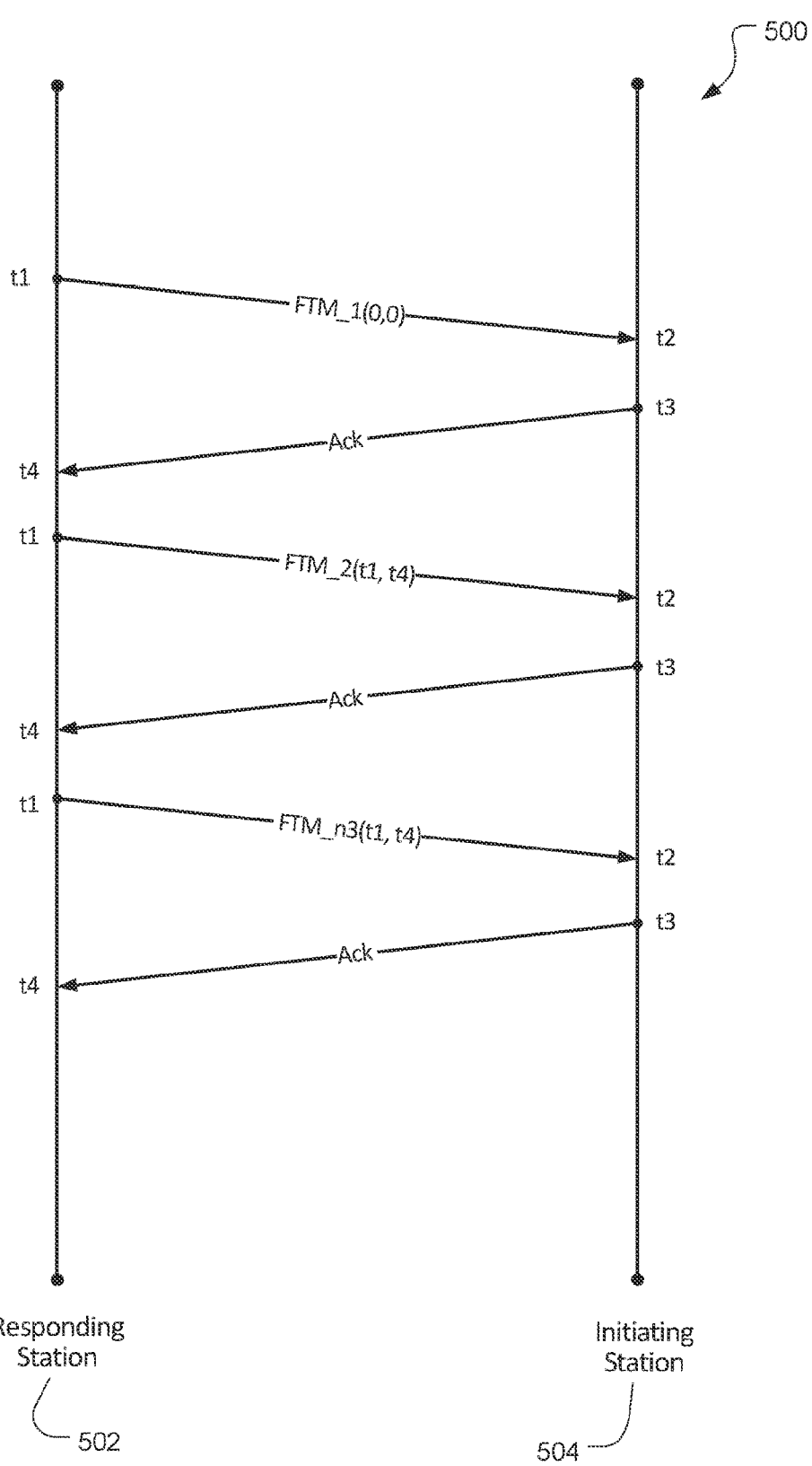
FIG. 5A is an example message flow for a round trip time measurement session.

Referring to FIG. 5A, an example of a conceptual diagram of a round trip time measurement session 500 is shown. The general approach includes a Responding station 502 and an Initiating station 504. The responding station 502 and the initiating station 504 may be a UE such as the UE 200, or other wireless mobile device configured to participate in time-of-flight based positioning. In an example, and not a limitation, the RTT measurement session 500 may be based on Fine Timing Measurement messages exchanged between the responding and initiating stations 502, 504. Other messages and signals such as positioning reference signals (PRS), sounding reference signals (SRS), Infra-Red camera signals, or other reference signals may be used to determine time-of-flight information between two UEs. The RTT session 500 may utilize a FTM Protocol (e.g., 802.11mc D4.3 section 10.24.6) to enable two stations to exchange round trip measurement frames (e.g., FTM frames). The initiating station 504 may compute the round trip time by recording the TOA (i.e., t2) of the FTM frame from the responding station 502 and recording the TOD of an acknowledgement frame (ACK) of the FTM frame (i.e., t3). The responding station 502 may record the TOD of the FTM frame (i.e., t1) and the TOA of the ACK received from initiating station 504 (i.e., t4). Variations of message formats may enable the timing values to be transferred between the responding and initiating stations 502, 504. The RTT is thus computed as:

$$RTT = [(t4 - t1) - (t3 - t2)] \tag{1}$$

The RTT session 500 may allow the initiating station 504 to obtain its range with the responding station 502. An FTM session is an example of a ranging technique between the responding station 502 and the initiating station 504. Other ranging techniques such as TDOA, TOA/TOF may also be used to determine the relative positions of the two stations. Other signaling may also be used to enable a negotiation process, the measurement exchange(s), and a termination process. For example, Wi-Fi 802.11az Ranging NDP and TB Ranging NDP sessions may also be used.

Figure 5B:
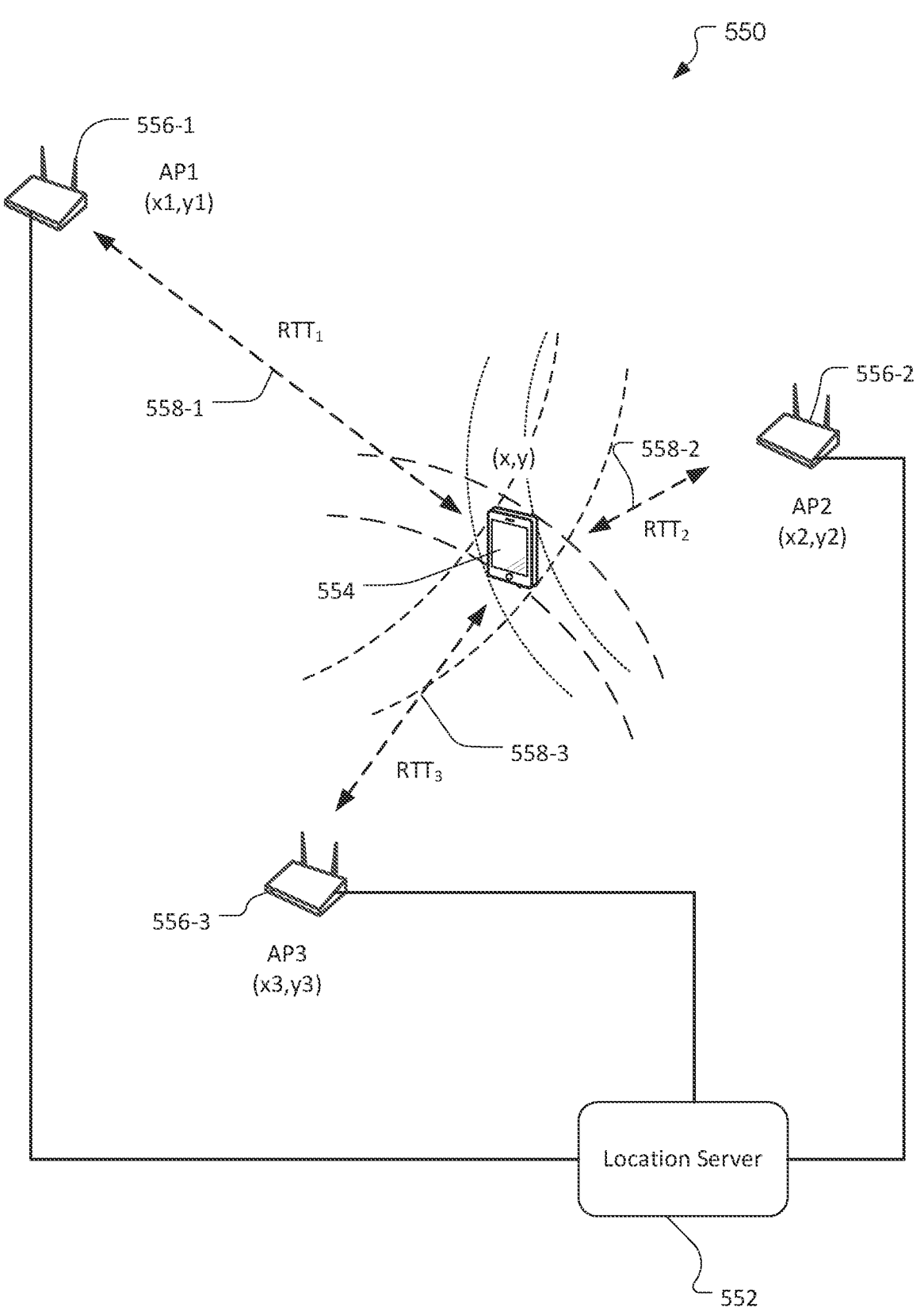
FIG. 5B is an example Wi-Fi wireless communication system.

Referring to FIG. 5B, an example Wi-Fi wireless communications network 550 according to aspects of the disclosure is shown. In the example of FIG. 5B, a location server 552 (which may correspond to any of the servers described herein) is attempting to calculate a position estimate for a UE 554, or assist another entity (e.g., an AP, the UE 554, another UE, a location server, a third party application, etc.) to calculate a position estimate of the UE 554. The UE 554 may communicate wirelessly with a plurality of Wi-Fi access points 556-1, 556-2, and 556-3 (which may correspond to any of the TRPs 300 described herein) using RF signals and standardized protocols for the modulation of the RF signals and the exchange of information packets. By extracting different types of information from the exchanged RF signals, and utilizing the layout of the Wi-Fi wireless network 550 (i.e., the AP's locations, geometry, etc.), the location server 552 may determine a position of the UE 554, or assist in the determination of the position, in a predefined reference coordinate system. In an aspect, the location server 552 may specify the position using a two-dimensional coordinate system; however, the aspects disclosed herein are not so limited, and may also be applicable to determining positions using a three-dimensional coordinate system, if the extra dimension is desired. Additionally, while FIG. 5B illustrates one UE 554 and three AP 556-1, 556-2, 556-3, as will be appreciated, there may be more UEs 554 and more base stations.

To support position estimates, the APs 556-1, 556-2, 556-3 may be configured to broadcast reference RF signals to UEs in their coverage area to enable a UE 554 to measure characteristics of such reference RF signals. For example, the UE 554 may measure the ToA and or RSSI of specific reference RF signals transmitted by at least three different APs and may use the MT positioning method to report these ToAs (and additional information) back to the location server 552 (e.g., via a serving AP). In order to determine the position (x, y) of the UE 554, the entity determining the position of the UE 554 needs to know the locations of the APs 556-1, 556-2, 556-3, which may be represented in a reference coordinate system as $(x_k, y_k)$, where k=1, 2, 3 in the example of FIG. SB. Where one of the APs 556-2 (e.g., the serving AP) or the UE 554 determines the position of the UE 554, the locations of the involved APs 556-1, 556-3 may be provided to the serving AP 556-2 or the UE 554 by the location server 552 (which has information of the network geometry). Alternatively, the location server 552 may determine the position of the UE 554 using the known network geometry.

Either the UE 554 or the respective APs 556-1, 556-2, 556-3 may determine the distance $(d_k$, where k=1, 2, 3) between the UE 554 and the respective APs 556-1, 556-2, 556-3. In an aspect, determining the RTT 558-1, 558-2, 558-3 of signals exchanged between the UE 554 and any AP 556-1, 556-2, 556-3 can be performed and converted to a distance $(d_k)$. RTT techniques can measure the time between sending a signaling message (e.g., reference RF signals) and receiving a response. The FTM procedures in FIG. 5A are an example of a RTT technique. These methods may utilize calibration to remove any processing and hardware delays. In some environments, it may be assumed that the processing delays for the UE 554 and the APs 556-1, 5:56-2, 556-3 are the same.

Once each distance $d_k$ is determined, the UE 554, a AP 556-1, 556-2, 556-3, or the location server 552 can solve for the position (x, y) of the UE 554 by using a variety of known geometric techniques, such as, for example, trilateration. From FIG. 5B, it can be seen that the position of the UE 554 ideally lies at the common intersection of three semicircles, each semicircle being defined by radius $d_k$ and center $(x_k, y_k)$, where k=1, 2, 3.

In some instances, additional information may be obtained in the form of an angle of arrival (AoA) or angle of departure (AoD) that defines a straight line direction (e.g., which may be in a horizontal plane or in three dimensions) or possibly a range of directions (e.g., for the UE 554 from the location of a AP 556-1, 556-2, 556-3). The intersection of the two directions at or near the point (x, y) can provide another estimate of the location for the UE 554. In an example, a single distance and AoA with one of the APs may be used to determine an estimated position of the UE 554.

A position estimate (e.g., for a UE 554) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location, such as a building plan or a floor map, or defined in absolute terms (e.g., using latitude, longitude, and possibly altitude). A position estimate may include an expected error or uncertainty (e.g., by including an area or volume within which the location is expected to be included with some specified or default level of confidence).

Figure 6:
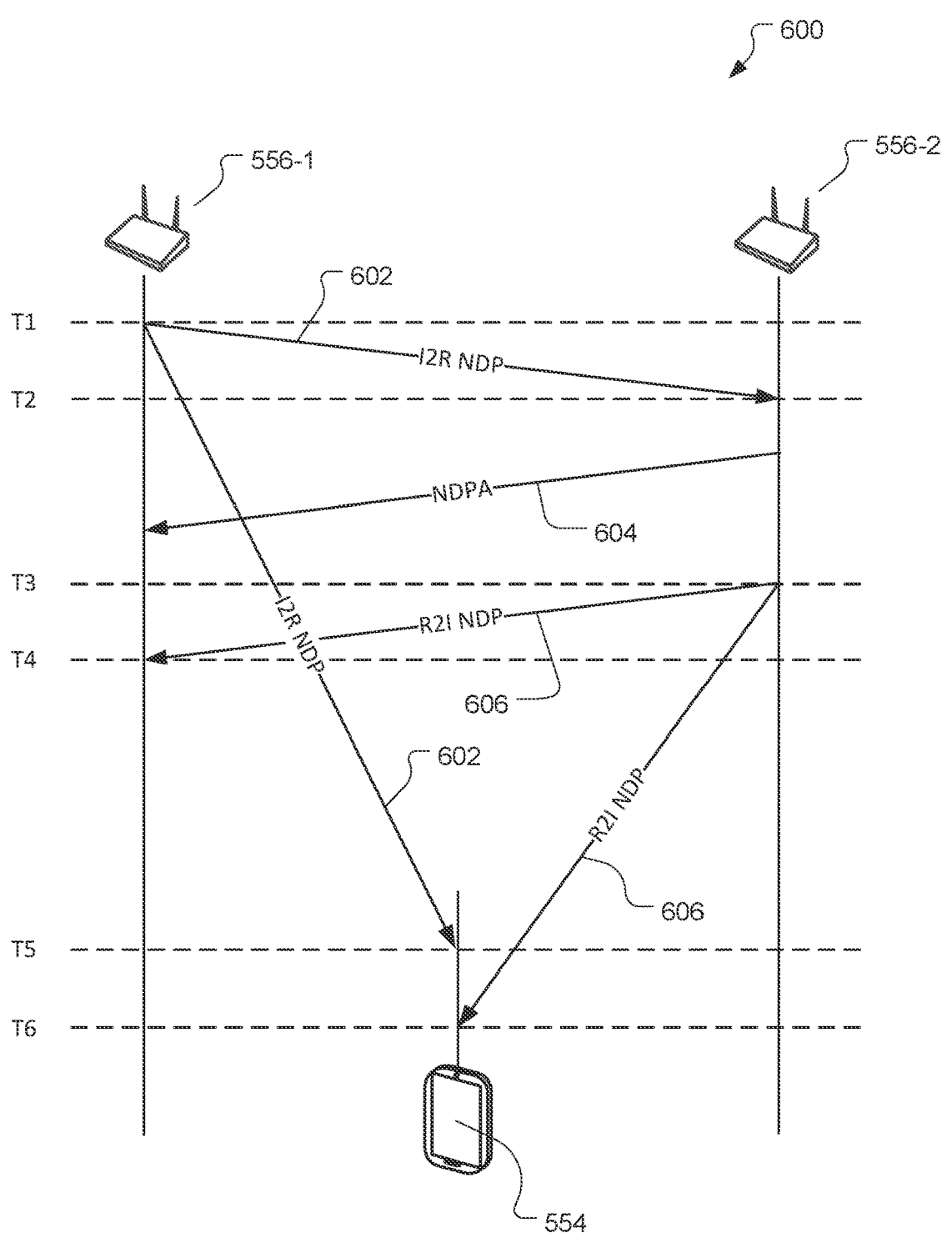
FIG. 6 is an example message flow for passive positioning with a user equipment.

Referring to FIG. 6, with further reference to FIG. 5B, an example message flow 600 for passive positioning with a plurality of APs is shown. The message flow 600 includes the first AP 556-1, the second AP 556-2, and the UE 554. In the message flow 600, the AP network 550 provides passive positioning service by exchanging NDP sounding packets between the APs, and client UEs listen to the packets. The location of the UEs may be estimated based on the received sounding packets. For example, the AP network 550 may utilize the passive positioning techniques described in 802.11az. In an example, the AP locations may be broadcast to the UEs. In a contact tracing application, the UE 554 may be configured to feedback a location estimate to the location server 552 (not shown in FIG. 6) for contact tracing. In an example, the message flow 600 includes transmitting a I2R NDP message 602 at time T1 with the first AP 556-1, which is received by the second AP 556-2 at time T2. The UE 554 is in a position to receive the I2R NDP 602 at time T5, The second AP 556-2 may send an acknowledgment message such as the NDPA message 604. The second AP 556-2 is configured to transmit an R2I NDP message 606 at time T3, which is received by the first AP 556-1 at time T4. The UE 554 is in a position to receive the R2I NDP 606 at time 16. The first AP 556-1 and/or the second AP 556-2 may be configured to indicate (e.g., via broadcasting or other signaling) the turnaround time (i.e., T3−T2), the time of flight (i.e., T2−T1), and other assistance data (e.g., locations of the APs 556-1, 556-2). In an example, the first AP 556-1 may indicate the time of flight, and the second AP 556-2 may indicate the turnaround time. In an embodiment, the UE 554 is configured to perform RSTD measurements based on the time of arrivals T5 and T6. In an embodiment, the UE 554 may be configured to store the respective ToAs (T5, T6) with station ID information (e.g., the MAC IDs of the respective first and second APs 556-1, 556-2) in a local data structure, and then provide the data to the location server 552. For example, the location server 552 may be configured to post process the measurements by receiving a bulk download of the measurements and estimate the location(s) of the UE 554 for potential contact tracing incidents.

Figure 7:
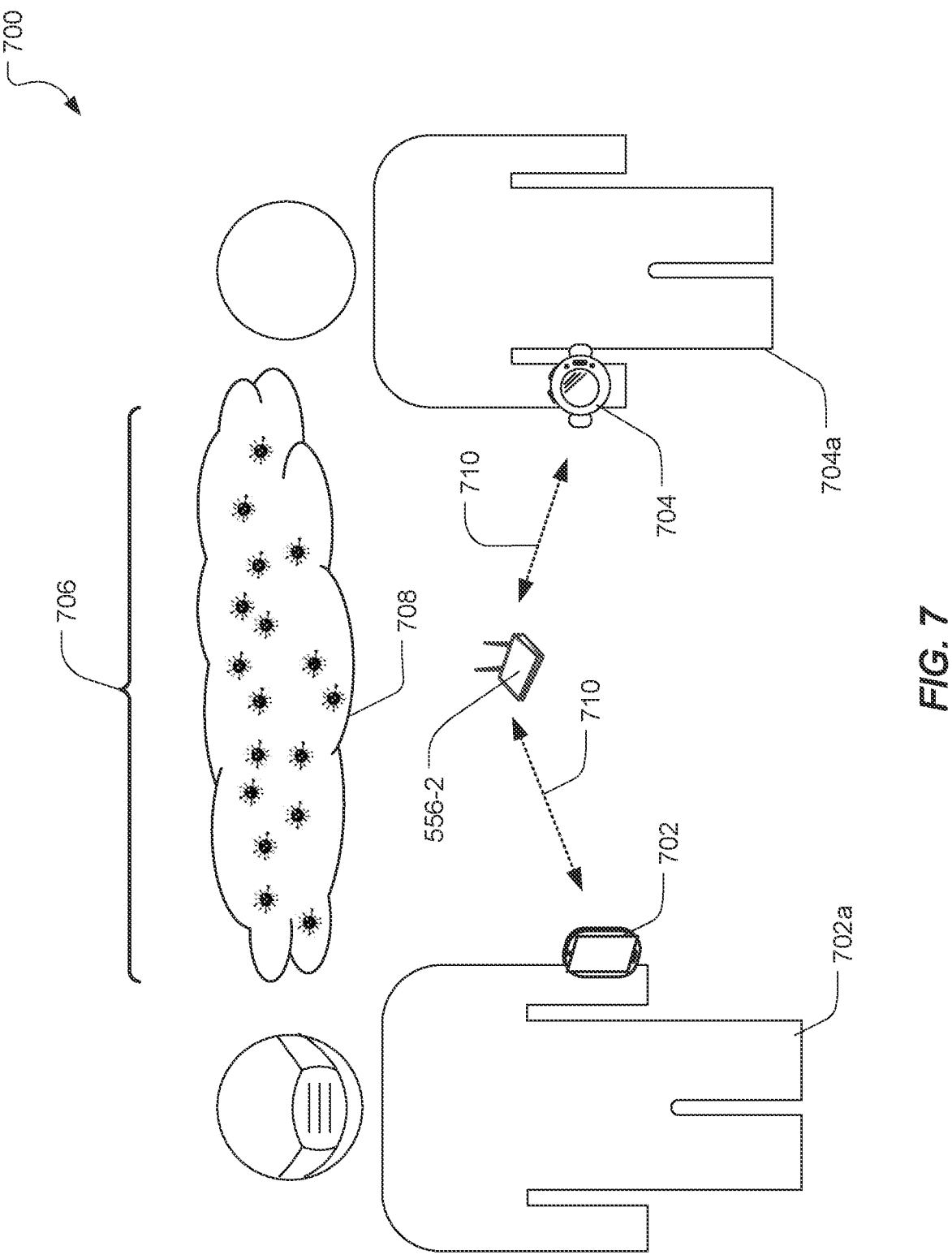
FIG. 7 is a conceptual diagram of an example contact trace proximity measurement.

Referring to FIG. 7, a conceptual diagram 700 of an example contact trace proximity measurement is shown. The diagram 700 includes a first mobile device 702 and an associated first user 702*a*, and a second mobile device 704 and an associated second user 704*a*. The mobile devices 702, 704 may correspond to a user equipment such as a cellphone, smartphone, smartwatch, laptop, tablet, PDA, tracking device, navigation device, IoT device, asset tracker, health monitors, wearable trackers. REID device, or some other portable or moveable device configured for wireless communications. A contact trace application may establish a contact range 706 (e.g., social distance, physical distance) based on a modeled spreading distance of a communicable disease 708. For example, a government entity such as the Centers for Disease Control and Prevention (CDC) may establish a target contact range of 6 feet. The mobile devices 702, 704 may exchange RF signals 710 with a Wi-Fi network (e.g., the second AP 556-2) to determine a range between the users 702*a*, 704*a*. The RF signals 710 may be based on existing wireless technologies such as, for example, IEEE 802.11 (including IEEE 802.11p), WiFi Direct (WiFi-D), 5G NR, side link protocols, and other wireless interfaces. In an example, the RF signals 710 between mobile devices 702, 704 and the network APs 556-2 the may include messages for a ranging technique (e.g., RTT, TDOA, TOA) and/or for determining a signal strength measurement (e.g., RSSI). The RF signals 710 may be used to perform a range measurement to determine the respective distances between the AP 556-2 and the first and second mobile devices 702, 704. The mobile devices 702, 704 may be configured to receive an indication of the presence of one another from a network (e.g., the AP network 550) and/or notify a respective user 702*a*, 704*a* via a user interface. In an example use case, the second user 704*a* may be infected with a communicable disease 708 and may be utilizing a contact tracing application configured to alert other users of this condition via a Wi-Fi network. The first user 702*a* may have a pre-existing condition which elevates the severity of the communicable disease 708 and thus may also utilize the contact tracing application. If the RF signals indicate a range that is less than the established contact range 706 for a period of time (e.g., a duration), then the users 702*a*, 704*a* may receive an alert via the RF signal 710 indicating the proximity to one another. The contact tracing application may also be configured to report proximity information to a network server as part of a larger contact tracing effort. The application of the determined range based on the RF signals 710 as compared to the established contact range 706 may assist in identifying and monitoring individuals who may have had contact with an infectious person and may help to control the spread of the communicable disease 708.

Figure 8A:
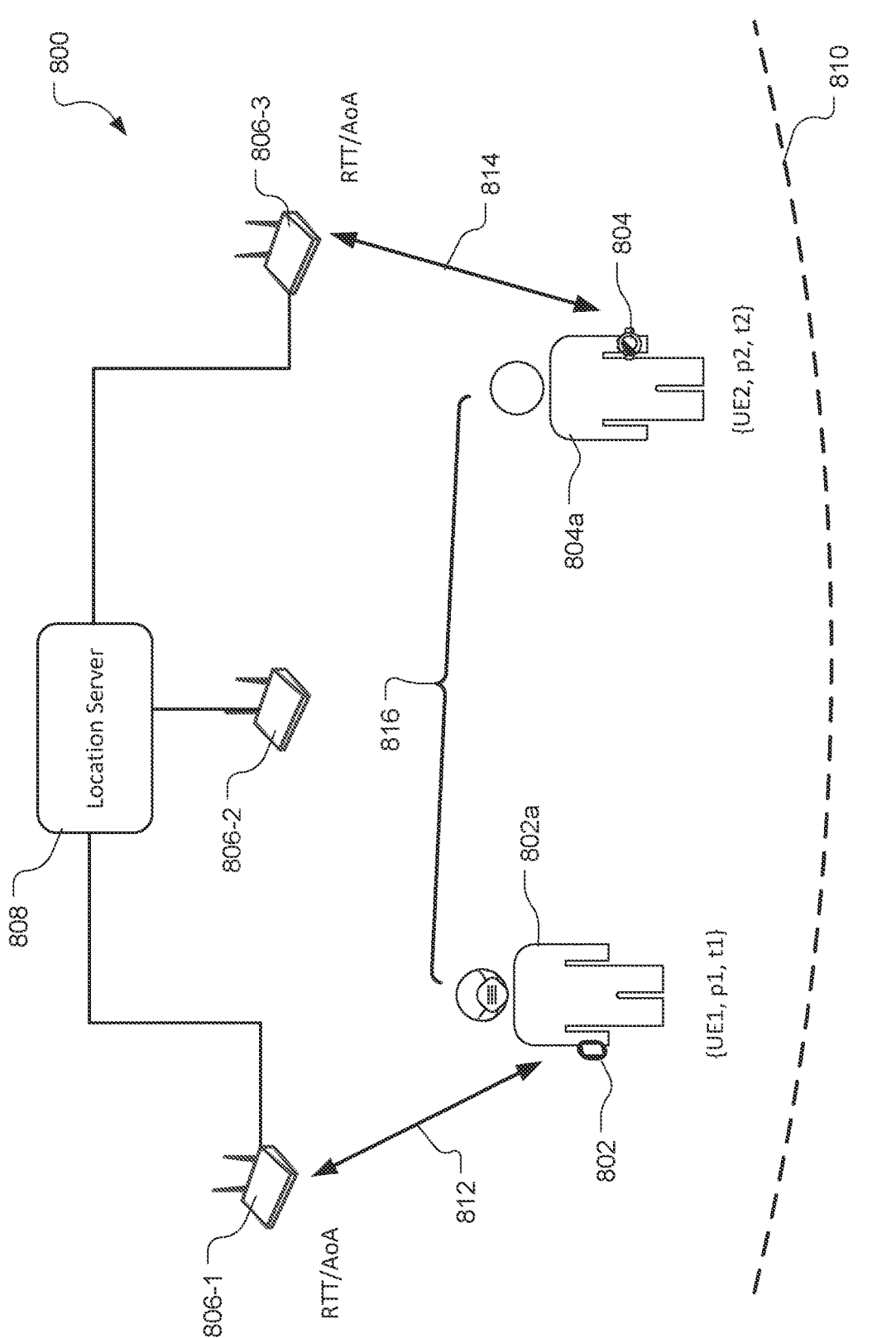
FIG. 8A is a conceptual diagram of a first example use case for Wi-Fi contact tracing with active positioning measurements.

Referring to FIG. 8A, a conceptual diagram of a first example use case 800 for Wi-Fi contact tracing with active positioning measurements is show. The use case 800 includes a first UE 802 associated with a first user 802*a*, and a second UE 804 associated with a second user 804*a*. The UEs 802, 804 may be associated with a wireless network including a first AP 806-1, a second AP 806-2, and a third AP 806-3 operably coupled to a location server 808. The UEs 802, 804 are examples of the UE 200, the APs 806-1, 806-2, 806-3 are examples of the TRP 300, and the location server 808 is an example of the server 400 and may be a local network server, or a server in the communication system 100 (e.g., the LMF 120 external client 130). In an example, an application on the UEs 802, 804 may be configured to execute when the UEs 802, 804 are within a range 810 of the wireless network. The range 810 may be based on a geofence associated with the network. In an example, the range detection may be based on a position estimate (e.g., via satellite or terrestrial or inertial navigation techniques), or when signals from one of the network APs is detected by a UE. In operation, when an AP (e.g., the first AP 806-1) and a client UE (e.g., the first UE 802) are associated, the AP 806-1 is configured to determine when the UE 802 is in an awake state and may be configured to initiate one or more ranging sessions 812 with the UE 802. Similarly, the third AP 806-3 and the second UE 804 are associated, and the third AP 806-3 may initiate a ranging session 814 with the second UE 804. For example, the ranging sessions 812, 814 may include AP-based location estimation by using RTT and/or AoA techniques. In general, the APs 806-1, 806-2, 806-3 may utilize 80 MHz and/or 160 MHz Wi-Fi signals to enable contact tracing. In an example, the APs 806-1, 806-3 do not need to estimate absolute locations of respective UEs 802, 804 because relative locations to the respective APs may be sufficient for contact tracing. If a single AP measures locations with multiple client UEs, the relative location to the same AP may be sufficient for contact tracing. Referring to FIG. 8A, when the UEs 802, 804 are measured with different APs (e.g., the first and third APs 806-1, 806-3), the APs may report which AP obtained the WIT and/or AoA measurements. For example, the location server 808 may receive RTT and/or AoA measurements and determine a contact distance 816 between the users 802*a*, 804*a* based on the relative locations of the UEs 802, 804 to the respective first and third APs 806-1, 806-3. The location server 808 is configured to receive relative positions from the APs in the network and compute the contact tracing results such as described in FIG. 5B. The location server 808 may be configured to gather information from the APs and compute contact tracing results by considering the location of each AR In an example, the relative position estimates (e.g., p1, p2) for the UEs (e.g., UE1, UE2) may include time stamps (e.g., t1, t2) to determine that contact distance 816 is temporally relevant. In an embodiment, the APs may be configured to provide measurements based on UE signals (e.g., UL signals transmitted from the UEs) and provide the AoA and/or range measurement information to the location server 808 without providing identification information for the UEs. That is, the APs may be configured to provide anonymous relative position information and the location server 808 may be configured to determine the positions of anonymous UE positions.

In an embodiment, a UE (e.g., the first UE 802) may be unassociated with the APs and an application executing on the UE 802 may be configured to prompt the user 802*a* to provide measurement data to the location server 808 when signals are transmitted by the AP network (e.g., the ranging sessions 812, or other broadcast signals) are detected. The application may have a configuration setting to indicate the user's preference for responding to unassociated networks.

For example, the UE 802 may be configured to automatically respond to contact tracing signals from unassociated networks.

Figure 8B:
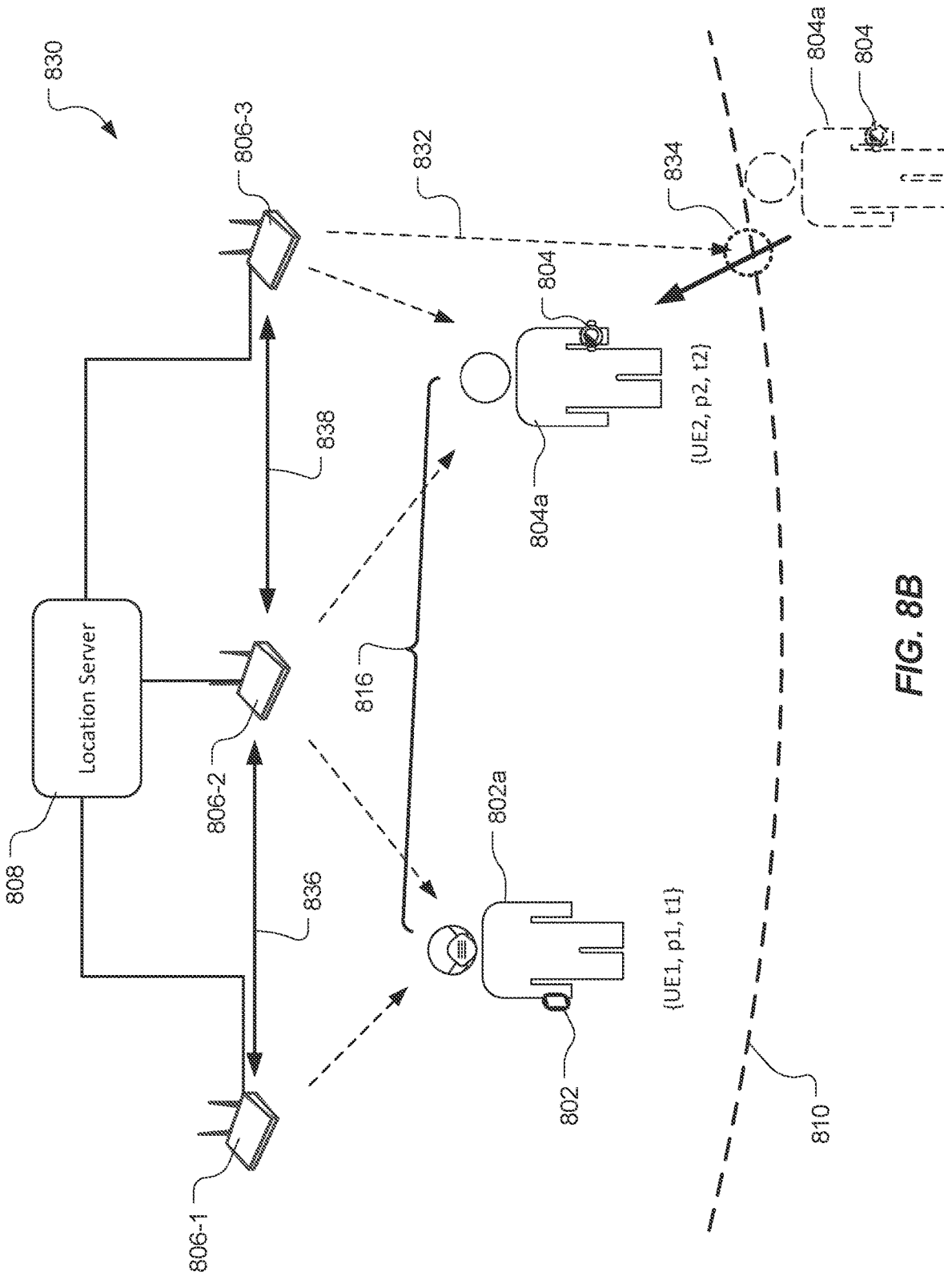
FIG. 8B is a conceptual diagram of a second example use case for Wi-Fi contact tracing with passive positioning measurements.

Referring to FIG. 8B, a conceptual diagram of a second example use case 830 for Wi-Fi contact tracing with passive positioning measurements is shown. The AP network may be configured to exchange NDP sounding packets such as described in FIG. 6. For example, the first AP 806-*a* may have a first NDP exchange 636 with the second AP 806-2, and the second AP 806-2 may have a second NDP exchange 838 with the third AP 806-3. The AP network may be configured to perform other NDP exchanges between other APs in the network. In operation, a contact tracing application executing on the UEs 802, 804 may be configured to detect the NDP exchanges 836, 838 when within range 810 of the AP network. For example, an application activation point 834 may be a location when the second UE 804 detects a RF signal 832 transmitted from one of the APs in the network (e.g., the third AP 806-3). The APs may be configured to broadcast NDP assistance data (e.g., station locations, timing, channels, turnaround times, time of flight information, etc.) to enable the UEs 802, 804 to determine a position estimate based on the NDP exchanges and report the position information and timestamp information to the location server 808. In an example, the UEs 802, 804 may be configured to detect the NDP messages and report the corresponding TOA information to the location server 808, and the location server 808 may be configured to determine the locations of the UEs 802, 804 and the corresponding contact distance 816. The UE 802, 804 may report other ranging information such as RSSI measurements, Channel State information (CSI), and station MAC IDs to enable the location server 808 to determine a distance between the UEs. The contact tracing application may include configuration options including constraints or criteria for reporting measurement results to the location server 808 and/or providing contact tracing information (e.g., maps, alerts, social distance thresholds, etc.) to the user. In an example, a UE may be configured to obtain positioning measurements based on the transmission schedule established by the network. The UE may also be configured to obtain the measurements periodically (e.g., every 1, 5, 10, 20, 100, secs. etc.), and/or based on other input such as detection of motion (e.g., via the IMU 270 or other sensors 213). The passive positioning measurements in the second use case 830 may be preferable in crowded venues (e.g., sports arenas, theme parks, conventions, etc.) where there may be insufficient messaging overhead to support active positioning messages between the network and each UE in the network.

Figure 8C:
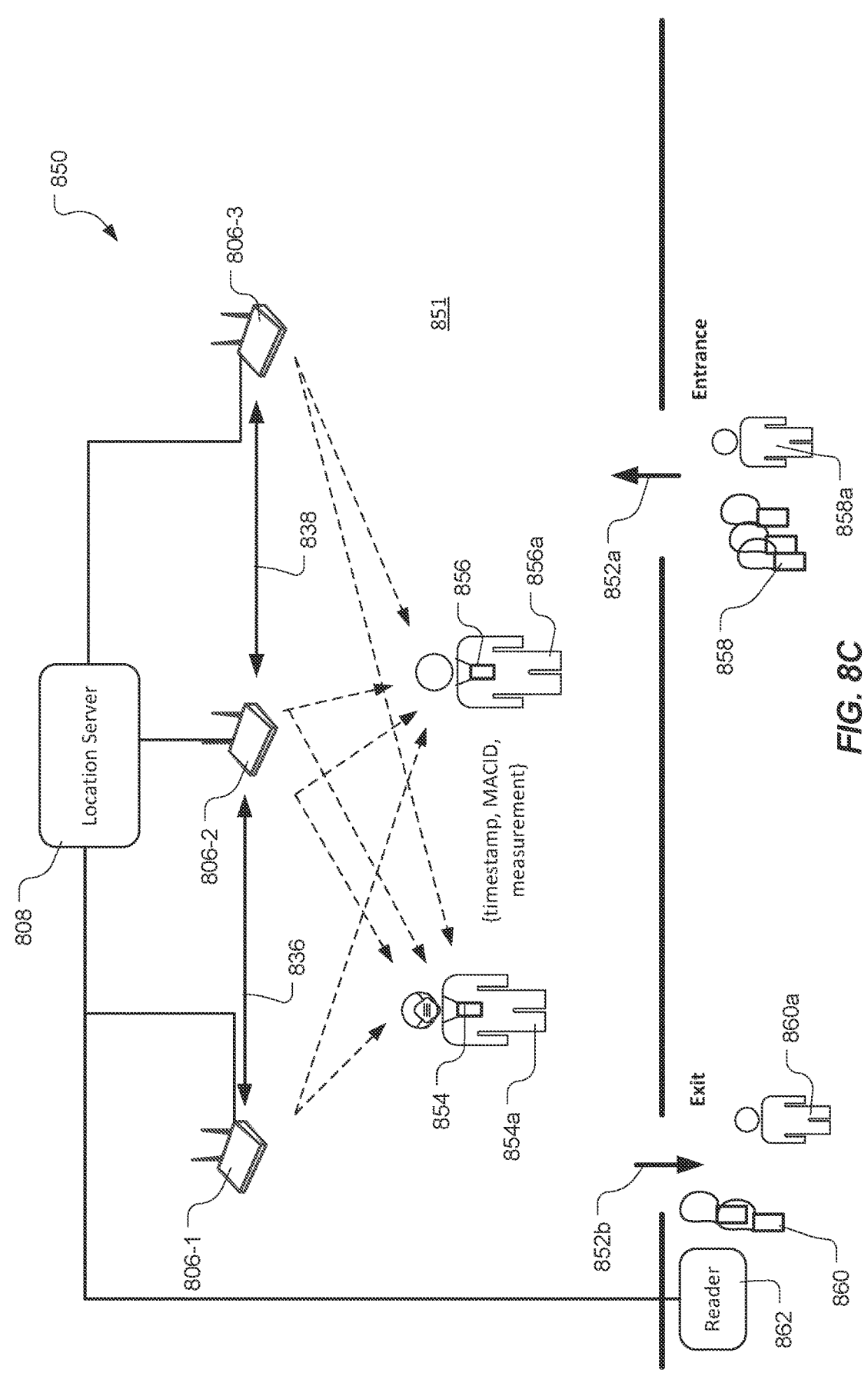
FIG. 8C is a conceptual diagram of a third example use case for contact tracing with low power user equipment.

Referring to FIG. 8C, a conceptual diagram of a third example use case 850 for contact tracing with low power user equipment is shown. An AP network may be configured to exchange ranging messages between APs, such as the first and second NDP sounding packets 836, 838 described in FIG. 8B. Other ranging transmissions, such as FTM, may also be used. In general, low power user equipment may include NR Light UEs, tracking devices, RFID devices, industrial wireless sensors, or other user equipment which may lack the power or capabilities to transmit data to the APs in the network. For example, the low power UEs may be a battery assisted RFID card configured to be worn by a user (e.g., via neck strap, wrist band, adhesive badge, etc.) and to receive the NDP sounding packets 836, 838 and store the receive TOA measurement information such as the time of arrival, MAC ID and other measurement data in a local memory. In an example, a low power UE may include a modulator, encoder, logic control circuits and memory components associated with RFID systems known in the art. In operation, in an example, a first low power UE 854 may be associated with a first user 854a and a second low power UE 856 may be associated with a second user 856a. The first and second users 854a, 856a may be, for examples, attendees at a venue 851 such as a restaurant, a theme park, a sporting event or an event in a crowded convention hall and may be assigned the respective UEs 854, 856 as a requirement for entering the venue 851. The low power UEs 854, 856 may be configured to receive the NDP sounding packets 836, 838 transmitted by the APs 806-1, 806-2, 806-3 on a periodic basis (e.g., every 1, 5, 10, 20.60, 120 secs., etc.) and/or based on other sensor input (e.g., motion detection accelerometers) and store the corresponding measurement data in a local data structure. In an example, an entrance area 852a may be a designated location for providing a low power UE to a user (i.e., prior to entering the venue 851). For example, a third user 858a may receive a third. UE 858 upon arrival at the entrance area 852a. An exit area 852b may be a designated area for reading and/or collecting the low power UEs from users that are exiting the venue 851. For example, a fourth user 860a may provide a fourth low power UE 860 to a RFID reader 862 configured to retrieve the tracking measurement data obtained when the fourth low power UE 860 was in the venue 851. The reader 862 may be configured to provide the tracking measurement information to the location server 808, and the location server 808 may be configured to determine the locations and potential contact incidents within the venue 851.

In an embodiment, the low power UEs 854, 856, 858, 860 may have additional features to facilitate contact tracing and other applications. For example, a low power UE may also be used to authenticate a user (e.g., to unlock doors, grant access to a computer, activate a time card, etc.) and the transfer of position tracking information may occur during the authentication events. In a restaurant application, a low power UE may also serve as a queue notification device for arriving guests. For example, the low power UE may include visual, audio and/or tactile components configured to alert a user when their assigned table is ready. The user may keep the low power UE on their person during the meal to collect positioning signals from the Wi-Fi network. The user may return the low power UE to be read (i.e., to obtain the positioning signal information) and processed by a location server. The user may be associated with the low power UE via reservation information, or credit card information, or other contact information. The user may be subsequently notified if the location server determines that a relevant contact event occurred based on the user's time and location in the restaurant. The passive positioning techniques and low power UEs described in FIG. 8C may be utilized in other use cases to help obtain contact tracing information in other venues or potentially crowded locations.

Figure 9:
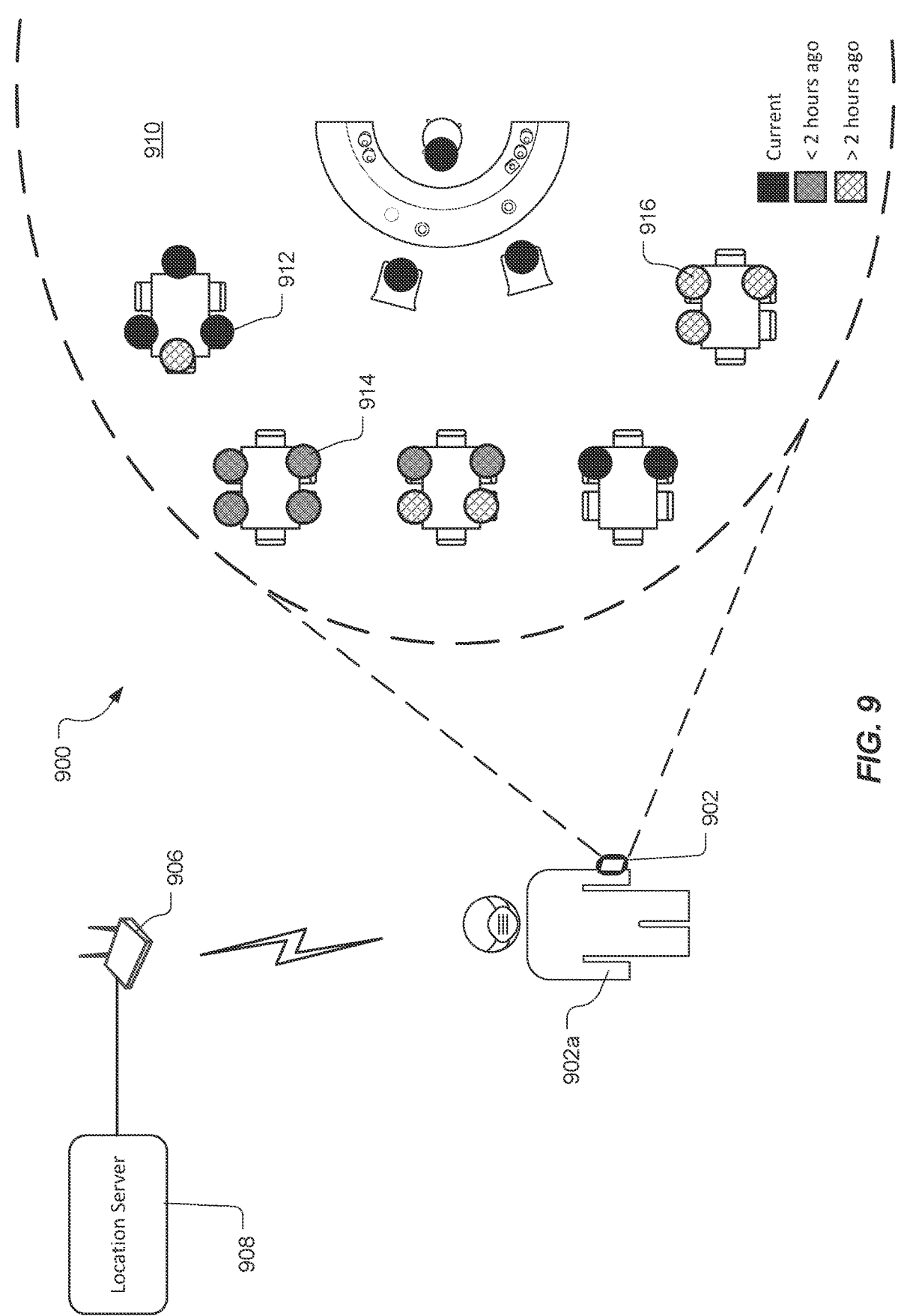
FIG. 9 is a conceptual diagram of a first example contact tracing application.

Referring to FIG. 9, a conceptual diagram of a first example contact tracing application 900 is shown. The application 900 may be configured to execute on a UE 902 based on data obtained from a location server 908 via an AP 906. The UE 902 may include one or more other components such as any of those shown in FIG. 2 such that the UE 200 may be an example of the UE 902. The AP 906 may include one or more other components such as any of those shown in FIG. 3 such that the TRP 300 may be an example of the AP 906. The location server 908 may include one or more other components such as any of those shown in FIG. 4 such that the server 400 may be an example of the location server 908. The user equipment 902 may be associated with a wireless network including the AP 906 and configured to provide contact tracing configuration options to the location server 908. The configuration options may include a time threshold to indicate the amount of contact history information the UE 902 desires. The location server 908, and the corresponding contact history may be associated with a location such as a restaurant, office, store, etc. that is served by a Wi-Fi network including the AP 906. The location server 908 is configured to obtain and process UE position measurements such as described in FIGS. 8A-8C. In operation, the AP 906 may provide the contact history information and associated mapping information to the UE 902, and the UE 902 is configured to display a graphic representation of the contact history information. For example, a map display 910 may include georeferenced contact history information indicating the relative locations of current and past users at the location. The map display may be configured to indicate current occupants 912 in a first color, recently departed occupants 914 is a second color, and previous occupants 916 in a third color. The colors are an example only, and not a limitation, as other visual effects may be used to distinguish between different groups. In an example, the recently departed occupants 914 may indicate the locations that were occupied within the last two hours, and the previous occupants 916 may indicate the locations that were occupied over two hours ago. The contact history information, and the corresponding map display 910, may be used to inform the user 902a of risk of contact in the location. For example, an individual with a pre-existing condition which may elevate their sensitivity to a contagion may prefer not to enter a location with a large number of current occupants 912. Similarly, they may also prefer to avoid the tables or other locations that correspond to the recently departed occupants 914 (e.g., to reduce the risk of encountering lingering contagion). In general, the map display 910 may enable the user 902a to make a determination on whether to enter a location and/or where to sit once in the location. The map display 910 may be useful to restaurant management, for example, to ensure that seating is assigned to reduce the potential of contact incidents with current guests, as well as previous guests (e.g., 1w seating a guest in the same location as recently departed occupants 914).

Figure 10:
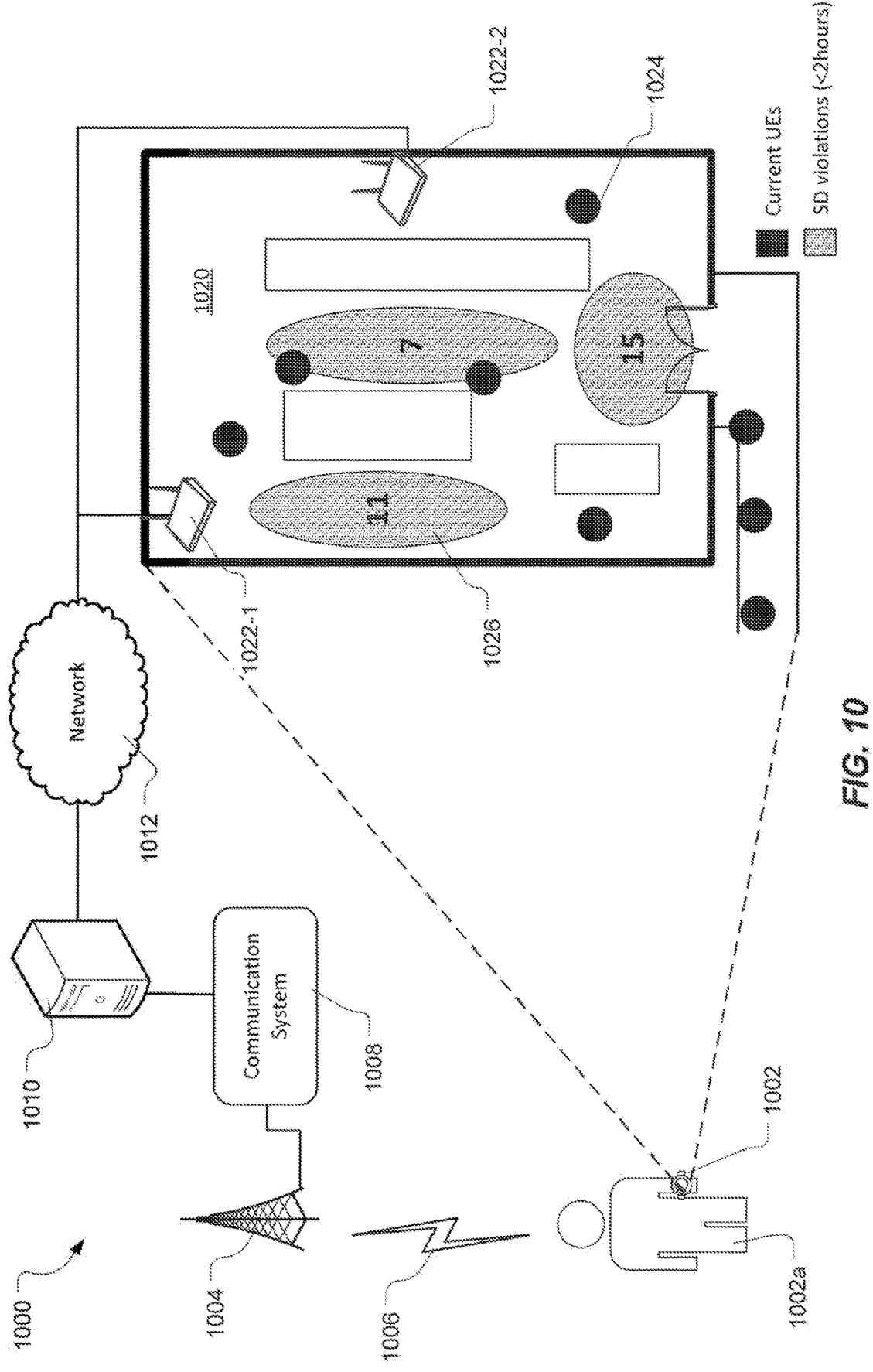
FIG. 10 is a conceptual diagram of a second example contact tracing application.

Referring to FIG. 10, a conceptual diagram of a second example contact tracing application 1000 is shown. The application 1000 may utilize a combination of APs and a cellular network to provide contact tracing information to a user. A user 1002a may desire to visit a location such as store, office, government building, etc. and would prefer to obtain current contact tracing information for the location before making the visit. For example, a location 1020 may include a Wi-Fi network including one or more APs, such as a first AP 1022-1 and a second AP 1022-2. The APs 1022-1, 1022-2 may be communicatively coupled to a network 1012 such as a Local Area Network (LAN) and/or the Internet. The network 1012 may include a server 1010 configured to obtain and process contact tracing information for the location 1020. For example, the server 1010 and APs 1022-1, 1022-2 may be configured to perform the active and/or passive techniques such as described in FIGS. 8A-8B. The server 1010 may be in communication with a communication system 1008. For example, the communication system 1008 may be the communication system 100 in FIG. 1, and the server 1010 may be a network server such as the LMF 120 or the external client 130. The server 1010 may be another data source such as a web server or cloud based application (e.g., Azure, Amazon Cloud, Google cloud, etc.). The communication system 1008 may include one or more base stations 1004 configured to communicate with a UE

1002 associated with the user 1002a. For example, the UE 1002 and the base station 1004 may utilize a communication link 1006 to exchange messages via existing wireless protocols (e.g., LPP/NPP, RRC, etc.). Other communications protocols, such as the hypertext transfer protocol (HTTP) may be used to exchange data with the server 1010 and the UE 1002.

In operation, the UE 1002 may provide configuration information to the server 1010 via the communication system 1008 to obtain contact history information for the location 1020. The configuration information may be based on a prior association between the user 1002a and the location 1020 (e.g., a subscription service, enrollment process, etc.). The server 1010 is configured to provide contact history information associated with the location 1020 based on the configuration information received from the UE 1002. In an example, the contact history information may include an indication of the number and georeferenced locations of UEs 1024 in or near the location 1020. The location information may only include a relative location of a UE without any additional device or user information. The intent of the contact information is to enable the user 1002a to determine if there desired visit to the location 1020 is practical in view of the number of current occupants and any concerns regarding a potential contact incident. In an example, the server 1010 may be configured to cluster prior contact incidents in the location 1020 and generate social distancing violation objects 1026 to indicate the areas in the location 1020 where contact incidents have taken place. The social distancing violation objects 1026 may indicate an area description and a count value to inform the user 1002a of the location(s) and number of contact incidents over a time period. The social distancing violation objects 1026 may be useful to the user 1002a to make a personal determination on whether a visit to the location 1020 represents a risk. The social distancing violation objects 1026 may also provide insight to the managers of the location 1020 regarding traffic flow through the location 1020 and enable the managers to adjust the environment and/or procedures in an effort to reduce contact incidents. The UE 1002 may be configured to present the contact history information, including the locations of UEs 1024 and the social distancing violation objects 1026 in a graphical display such as depicted in FIG. 10. Other graphical objects may also be used to inform the user 1002a of the contact tracing history of the location 1020.

Figure 11:
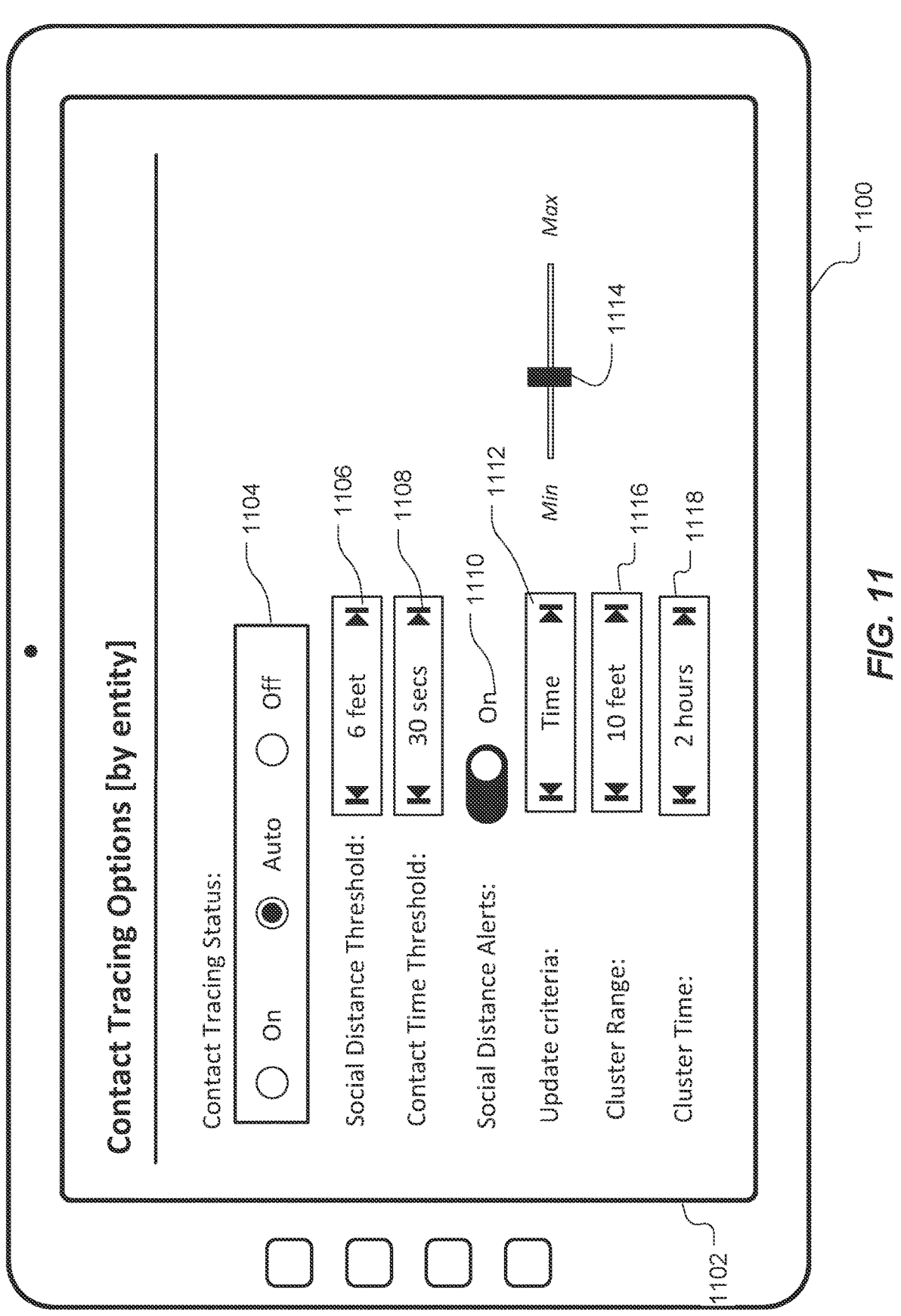
FIG. 11 is a wire diagram of an example user interface for receiving contact tracing configuration options.

Referring to FIG. 11, with further reference to FIGS. 8A-10, a wire diagram of an example user interface (UI) for receiving contact tracing configuration options is shown. The UI may be displayed in a display 1102 in a UE 1100. The UE 1100 may include one or more other components such as those shown in FIG. 2 such that the UE 200 may be an example of the UE 1100. A contact tracing selection object 1104 may include options to configure the UE 1100 to participate in a contact tracing network. For example, an 'On' option may be selected to participate in all contact tracing networks, an 'Auto' option may be selected to participate only in contact tracing networks in which the UE 1100 was previously associated with, and an 'Off' option may be used to disable contact tracing. A social distance threshold selection object 1106 may include values to enable the user to define the distance of a contact incident. For example, 6 feet may be a default value, but higher or lower values may be selected based on a possible contagion and/or the constitution of the user (e.g., susceptibility to a contagion) A contact time threshold value section object 1108 may be used to indicate the duration required to determine a contact incident. That is, another device must be within the social distance threshold for the contact time to be classified as a contact incident. A social distance alerts activation object 1110 may be used to enable alerts on the UE 1100. In operation, the configuration options may be provided to a location server and the location server may be configured to provide alerts based on the user's desired configuration options. Thus, when the social distance alerts are activated, the UE 1100 may provide an audible, visual, and/or tactile output to notify the user that they are violating their desired social distancing thresholds. An update criteria object 1112 may be used to indicate the basis on which the UE 1100 will process Wi-Fi positioning measurement signals. For example, the criteria may be time based, motion based, or location based. A sensitivity slider object 1114 may be used to input a relative value for the update criteria. For example, when a time based criteria is selected, the slider object 1114 may allow the user to select a period between 1 second and 5 minutes, for example (other time durations may also be used). When a motion based criteria is selected, the slider object 1114 may indicate the level of motion (e.g., motion detection time) to provide updates based on a detection of a minor or more significant motions (e.g., 0.1 sec to 3 sec). When a location based criteria is selected, the slider object 1114 may indicate a distance moved (e.g., 1' to 10') before the UE 1100 will process Wi-Fi positioning measurement signals. For example, the UE 1100 may utilize the IMU 270 to detect a change in location. A cluster range selection object 1116 may be used to indicate the distance between two or more contact incidents to form a social distancing violation object 1026. That is, contact incidents which occur within the cluster range of one another are plotted as a single social distancing violation object 1026 which covers an area including the contact incidents. A cluster time selection object 1118 may be used to define a time limit in which two or more contact incidents are considered in the same social distancing violation object 1026. The configuration objects and associated values are examples only, and not limitations, as other objects and configuration values may be used. In an example, the configuration options may be associated with a location and/or a particular Wi-Fi network.

Figure 12:
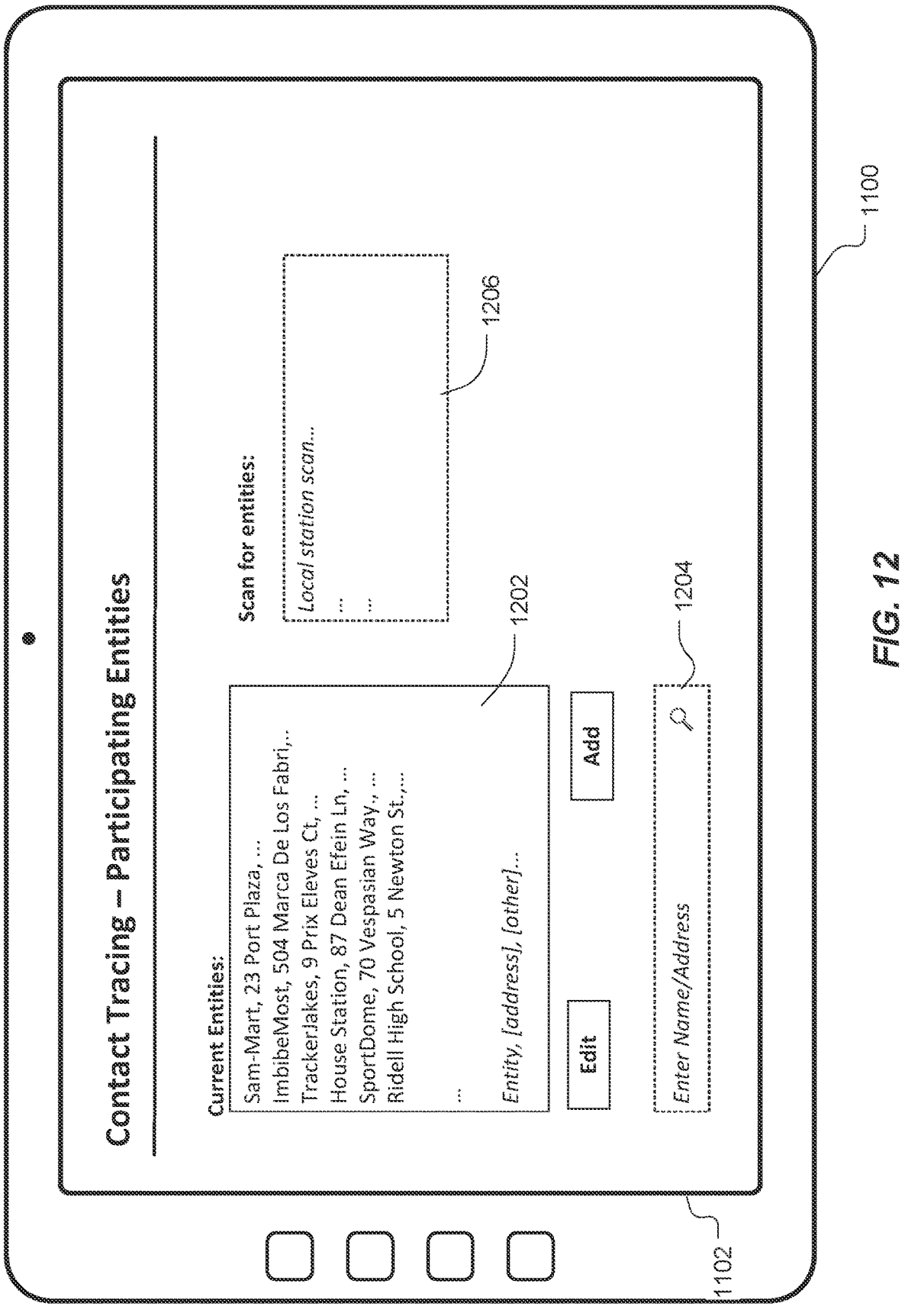
FIG. 12 is a wire diagram of an example user interface for joining a contact tracing network.

Referring to FIG. 12, with further reference to FIGS. 8A-11, a wire diagram of an example user interface for joining a contact tracing network is shown. The contact tracing configuration options UE. 1100 may include associations with particular entities and/or Wi-Fi networks. For example, an entities list box object 1202 may indicate the entities which have networks the UE 1100 will associate with (i.e., via log-in criteria). The association may be used to associate the UE 1100 with a user should the entity need to notify the user of a contact incident based on the network position measurements. In an example, the mapping applications depicted in FIGS. 9 and 10 may require an association with the UE 1100 to receive the contact and map data as described. That is, the mapping capabilities may provide an incentive for a user to participate in the contact tracing network. The entity information may be based on location information such as entity name and address. Other network information may also be used. A search text box object 1204 may be used to search for a contact tracing entity. For example, a network server may include an index of contact tracing networks, and the UE 1100 may utilize the search text box object 1204 to find the network and form an association with the network via a web server. In an example, the UE 1100 may be configure to perform a local scan for proximate APs and display the scan results in a scanned entities list box object 1206. The user may create an association with a network by selecting one of the detected APs and providing appropriate credentials. The new network may be added to the entities list.

Figure 13:
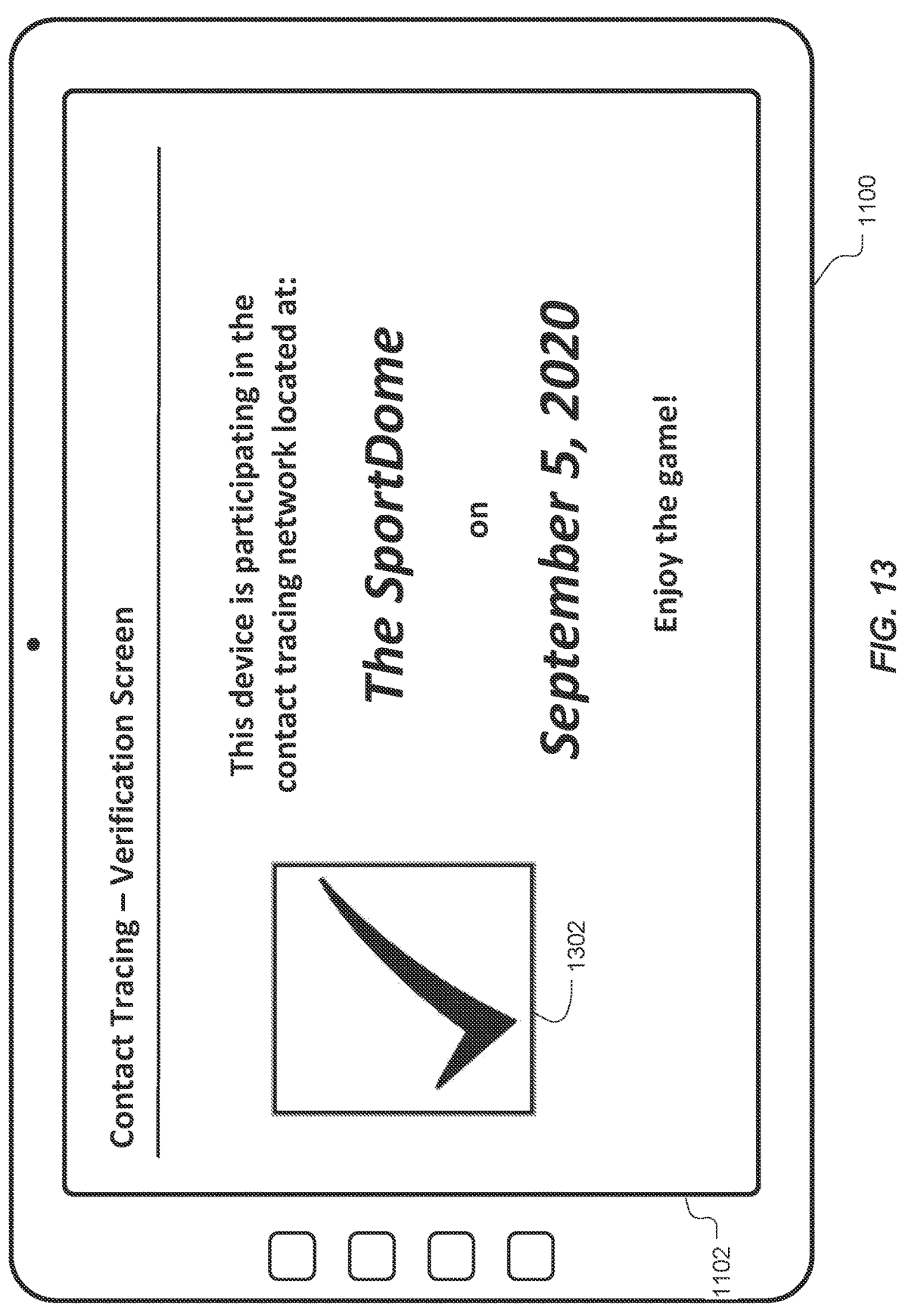
FIG. 13 is a wire diagram of an example contact tracing verification screen.

Referring to FIG. 13, with further reference to FIGS. 8A-12, a wire diagram of an example contact tracing verification screen is shown. A contact tracing application may include verification screen objects configured to demonstrate that a device is actively participating in a contact tracing network. In a use case, a venue may require each user to utilize a UE to participate in a contact tracing application and a verification screen may be used to confirm that the user is actively participating in a contact tracing network. For example, attendees at a sporting event may be required to demonstrate that they are participating with a contact tracing network When they enter the stadium. The display 1102 may be configured to present the verification screen when the UE 1100 joins the contact tracing network. The user may present the UE 1100 with the verification screen on the screen to a stadium employee (e.g., ticket taker, usher, security staff, etc.) upon entering the stadium. In an example, the verification screen may have a configurable verification object 1302 to customize the verification screen for a particular event or time period. The verification object 1302 may be an icon, image, QR code, bar code, or other custom visual object that may be recognized by a human and/or a reading device (e.g., bar code reader, QR code scanner, optical scanner). In operation, a contact tracing application on the UE 1100 may enable the verification screen when an association process with a local Wi-Fi network is complete and the UE 1100 is providing location measurements to a location server. In an embodiment, other screens and/or alerts may be displayed if the UE 1100 disconnects from a local Wi-Fi network. The verification screen in FIG. 13 may be associated with other networks and/or entities. For example, the entities displayed in the entity list box 1202 (e.g., a large store, restaurant, public building, etc.) may require occupants to present their mobile devices prior to gaining access to a respective facility. Each of the different entities may have different verification screens and different verification objects 1302. Other components in the UE 1100 may also be used to demonstrate the device is participating in a contact tracing network. For example, a visible light sequence, audio tone(s) or clips (e.g., .way files), tactile vibration signals, etc. may be used to demonstrate the UE 1100 is associated with a contact tracing network. In an example, another RF signal such as Bluetooth or an RFID transponder may be used to interrogate the UE 1100 and determine if the UE 1100 is participating in a Wi-Fi network.

Figure 14:
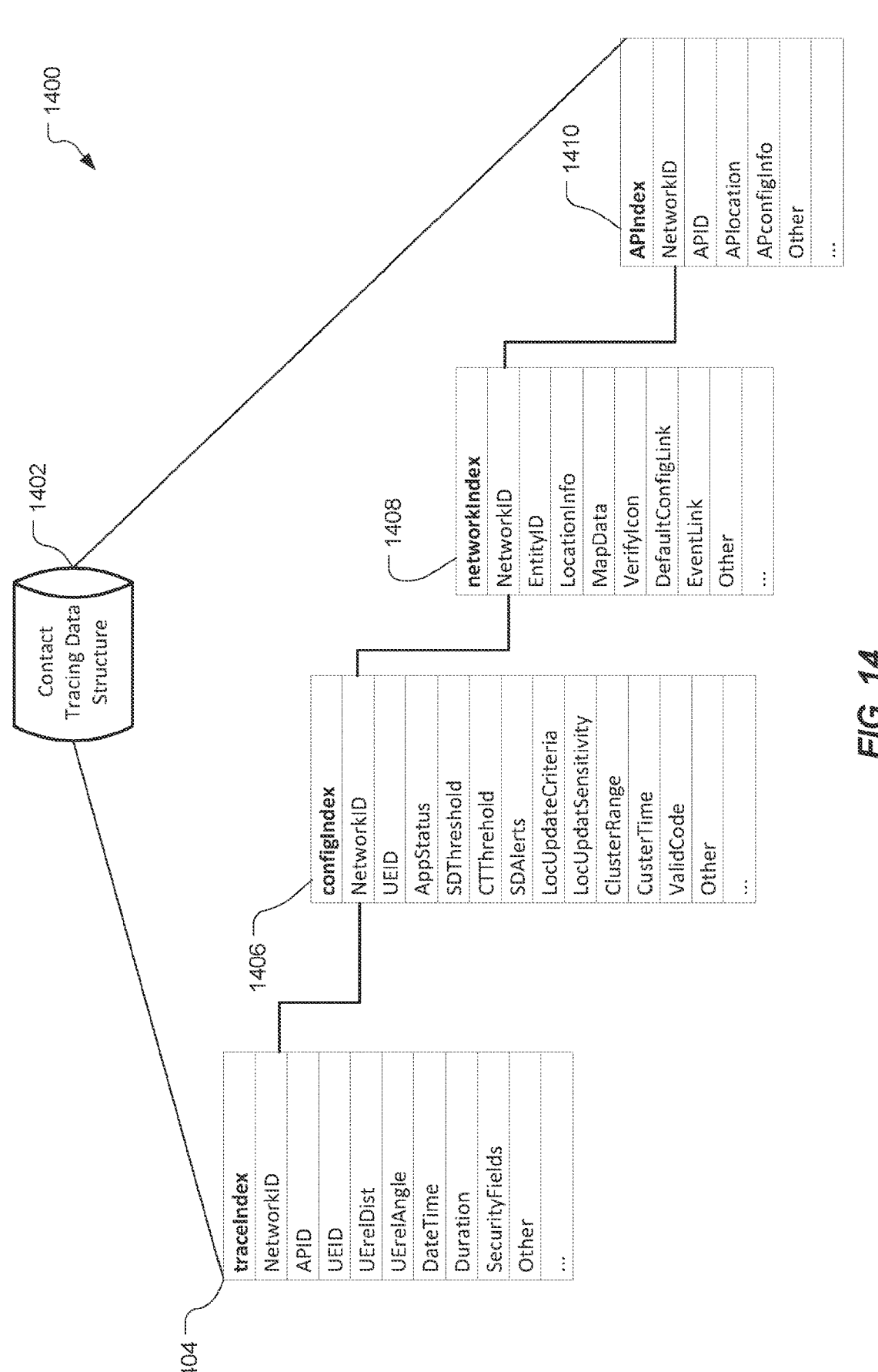
FIG. 14 is an example data structure of a contact tracing application.

Referring to FIG. 14, an example data structure 1400 of a contact tracing application is shown. The one or more objects of the data structure 1400 may persist on the location server 808, on another networked server 400 such as the LMF 120, on a UE 200, and/or a low powered UE 854. The data structure 1400 may be disposed on a memory device 1402 such as a solid state or mechanical hard drive, and may include a plurality of data records stored in a relational database application (e.g., Amazon Aurora, Oracle Database, Microsoft SQL Server, MySQL, DB2, etc.), or stored in one or more flat files (e.g., JSON, XML, CSV, etc.). The table structures and fields in the data structure 1400 are examples only, and not a limitation, as other data fields, tables, stored procedures and indexing schemas may be used to construct the data structure 1400, in an example, a contact trace table 1404 may be configured to capture elements associated with a Wi-Fi signal detected and measured by a UE. A NetworkID field may be used to identify a particular Wi-Fi network and other records and fields associated with the network (e.g., entity name, map data, station locations, etc.). An APID field may be used to identify the AP providing ranging measurement signals such as an active RTT exchange with the UE or another AP. The UEID field may be used to identify the UE that is obtaining the ranging measurement signal. A UErelDist field and UErelAngle field may be used to indicate the relative distance and bearing between the AP and the UE (e.g., APID and UEID). A DateTime field may be used to indicate a time stamp of when a ranging measurement signal is received, and a Duration field may be used to indicate a period of time the AP and UE have maintained the same relative positions. Other security fields may be included that improve the assurance of the measurements such as a Trusted Location, a Trusted Time, a Device Attestation Token, Device ID derived from Hardware Root-of-Trust. In addition, other privacy preserving attributes may be added such as Device ID encrypted with derived privacy preserving keys stored in hardware e-fuses.

A configuration table 1406 may be used to capture a user's contact tracing configuration options, such as depicted in FIG. 11. In an example, the configuration options may be associated with a particular contact tracing network (e.g., via the Network ID field) and/or a particular UE (e.g., via the UEID field). An application status field may be used to indicate the current status of a contact tracing application on a UE (e.g., on, auto, off). A social distance threshold (SDThreshold) field may be used to define the distance threshold for a contact incident. A contact time threshold (CTThreshold) field may be used to indicate the duration required to determine a contact incident. A social distance alerts (SDAlerts) field may be used to enable alerts on a UE. An location update criteria (LocUpdateCriteria) field may be used to indicate the basis on which a UE will process Wi-Fi positioning measurement signals. A location update sensitivity (LocUpdgeSensitivity) field may be used to indicate a value for the location update criteria. A cluster range (ClusterRange) field may indicate the distance between two or more contact incidents to form a social distancing violation object 1026. A cluster time (ClusterTime) field may be used to indicate a time limit in which two or more contact incidents are considered in the same social distancing violation object 1026. A validation code (ValidCode) field may be used as a security feature to validate that a user equipment (UEID) is authorized to participate in a contact tracing network (e.g., based on the networkID). Other configuration fields may be used to define the interaction between a contact tracing application executing on a UE and a local contact tracing network.

A network table 1408 may be used to define the functionality and other operational aspects of a Wi-Fi based contact tracing network. An EntityID field may be used to associate a network with an entity such as a business, location, public building, etc. The EntityID may be a link to an entities table (not shown in FIG. 14). A LocationInfo field may be used to indicate a location of the network. A MapData field may be used to indicate one or more mapping references associated with the network. For example, the mapping references may include building and floor plans to enable the location server 808, or a UE, to plot and display contact tracing incidents with a visual context of the location. A verification icon (VerifyIcon) field may be used to generate a verification object 1302 that is associated with the network. A default configuration link (DefalutConfigLink) field may be used to assigned preconfigured or mandatory contact tracing application configuration settings for the network. Thus, the values of the fields in the configuration table 1406 for a particular network record may be set to the default values. An event link (EventLink) field may be used to associate a network with an event, and/or to customize a network and the associated configuration options for a particular event. Other and/or alternative fields may be used to define a network. An AP configuration table 1410 may be used to define the parameters associated with Wi-Fi access points. For example, a network association (i.e., network ID field) may define which network the AP belongs to. Other identification, location and configuration fields may also be used to define the operational parameters of an AR Referring to FIG. 15, with further reference to FIGS. 144, a method 1500 for reporting a signal measurement to a contact tracing network includes the stages shown. The method 1500 is, however, an example only and not limiting. The method 1500 may be altered, e.g., by having stages added, removed, rearranged, combined, performed concurrently, and/or having single stages split into multiple stages.

At stage 1502, the method includes activating a contact tracing application based on a proximity to a contact tracing network. The UE 200 is a means for activating a contact tracing application. The contact tracing application may be stored in the memory 211 and may include one or more components within an operating system on the UE 200. In an example, the application may utilize a wireless transceiver 240 to detect the presence of an AP in Wi-Fi network and associate the detected AP with a network ID in the contact tracing data structure 1400. The Wi-Fi network may also be associated with one or more contact tracing configuration options in the contact tracing data structure 1400. In an embodiment, a Wi-Fi network may broadcast information indicating that the network is a contact tracing network, and the UE 200 may be configured to execute the contact tracing application based on receiving the information from the Wi-Fi network. The proximity to the network may be based on detecting an RF signal (e.g., such as the RF signal 832), and/or based on an estimated position of the UE. That is, when the UE 200 is within a geographic range 810 of one or more APs in the network. The estimated position of the UE may be determined with satellite and/or other terrestrial and inertial navigation techniques. In an embodiment, the UE 200 may be a low power UE with reduce capabilities and activating the contact tracing application may include a general activation of the low power UE. For example, referring to FIG. 8C, activating the contact tracing application may include assigning the low power UE to a user at the entrance area 852*a*. In an embodiment, the UE 200 may be configured to provide one or more contact tracing configuration options based on the proximity to the contact tracing network. In an example, a user may activate the contact tracing application by performing an execution action on the UE 200 (e.g., clicking an icon, typing a command, etc.).

At stage 1504, the method includes receiving one or more measurement signals from a station in the contact tracing network. The UE 200 is a means for receiving the one or more measurement signals. In an example, one or more of the measurement signals may be based on an active positioning technique such as an RTT exchange between the UE and an AP. Referring to FIG. 8A, the first UE 802 is configured to participate in a ranging session 812 with the first AP 806-1. The active positioning technique may be based on an FTM exchange such as depicted in FIG. 5A, or on other ranging message exchanges such as via sidelink reference signals or other reference signals. In an example, one or more of the measurement signals may be based on passive positioning techniques such as depicted in FIGS. 6, 8B and 8C. For example, the APs in a network may be configured to exchange ranging messages (e.g., NDP, FTM, etc.) and the UE 200 is configure to determine the arrival times of the respective ranging messages (e.g., T5, T6). In an example, the UE 200 may be configured to determine the time difference of arrival of the different ranging messages. Other measurement signals may also be transmitted by the APs and received by the UE 200.

At stage 1506, the method includes reporting the signal measurement and station identification to a network entity. The UE 200 is a means for reporting the signal measurements. The network entity may be an access point, a server, a web server, or other element of a contact tracing application configured to receive measurement information. In an example, the UE 200 may be associated with an AP in the contact tracing network and may be configured to provide measurement information obtained at stage 1504 to a location server 808 in the contact tracing network. The measurement information may include AP id information (e.g., MAC ID), time stamp information. RSSI measurements, or other parameters associated with the received measurement signals. In an example, the UE 200 may not be associated with a station in the Wi-Fi network and may utilize another device or network to report the signal measurements. For example, the UE 200 may be configured to utilize a cellular network such as the communication system 100 to provide the measurement information to the location server 808. The location server 808 may be the LMF 120 or the external client 130, for example. The location server 808 is configured to utilize the reported measurement information to determine the location of the UE 200, and then determine contact incidents based on the locations of other UEs. In an embodiment the location server 808 may be configured to generate contact alarms based on the contact incidents and a user's contact tracing configuration options. The alarm may be provided to the UE 200 via, the Wi-Fi network (e.g., for an associated UE), or via another network (e.g., the communication system 100). For example, the alarm may be in the form of a text message, alert, notification, or other object based on the capabilities of the UE 200.

Referring to FIG. 16, with further reference to FIGS. 1-14, a method 1600 for displaying a contact history map includes the stages shown. The method 1600 is, however, an example only and not limiting. The method 1600 may be altered, e.g., by having stages added, removed, rearranged, combined, performed concurrently, and/or having single stages split into multiple stages.

At stage 1602, the method includes activating a contact tracing application. The UE 200 is a means for activating a contact tracing application. The contact tracing application may be stored in the memory 211 and may include one or more components within an operating system on the UE 200. In an example, a user may activate the contact tracing application by performing an execution action on the UE 200 (e.g., clicking an icon, typing a command, etc.).

At stage 1604, the method includes providing one or more contact tracing configuration options to a contact tracing network. The UE 200 is a means for providing the one or more contact tracing configuration options. In an example, referring to FIG. 9, the UE 902 may be configured to provide contact configuration options to the location server 908 via the AP 906 when the UE 902 is associated (e.g., authenticated) on the Wi-Fi network including the AP 906. In another example, referring to FIG. 10, the UE 1002 may utilize the communication system 1008 to provide configuration options to the server 1010. The configuration options may be used by a location server to provide contact history information to a UE based on a user's preferences. For example, referring to FIG. 11, the configuration options may enable the location server to evaluate social distance thresholds, contact time thresholds, cluster parameters, etc. to generate and/or filter contact tracing records for output to a user.

At stage 1606, the method includes receiving contact history information based at least in part on the contact tracing configuration options. The UE 200 is a means for receiving the contact history information, in an example, the location server 908 may provide the UE 902 with contact history information via the AP 906. The contact history information is based on the contact information obtained on the local network. For example, the contact history may include location and time information associated with other UEs within range of the network, such as the current occupants 912, recently departed occupants 914, and the previous occupants 916. The contact history may also include transformations of contact incident data such as the social distancing violation objects 1026. The contact history information may also be received via the communication system 1008.

At stage 1608, the method includes displaying a contact history map based at least in part on the contact history information. The UE 200 is a means for displaying the contact history map. In an example, the contact tracing application may include map data associated with a contact tracing network (e.g., NetworkID, MapData in the data structure 1400). The contact history information including the relative locations of the UEs, locations of contact incidents, and objects derived from the locations (e.g., social distancing violation objects) may be geo-referenced to the map data. Referring to FIGS. 9 and 10, for example, the contact history map may be the map display 910 or the representation of the location 1020 to enable users to make decisions about when and where to occupy an area with other individuals.

Referring to FIG. 17, with further reference to FIGS. 1-14, a method 1700 for providing contact tracing information with low power user equipment includes the stages shown. The method 1700 is, however, an example only and not limiting. The method 1700 may be altered, e.g., by having stages added, removed, rearranged, combined, performed concurrently, and/or having single stages split into multiple stages.

At stage 1702, the method includes receiving one or more wireless ranging signals with a first radio access technology. A low power UE 854 is a means for receiving the one or more ranging signals. The low power UE 854 may be, for example, an RFID device or battery assisted RFID device configured to receive and store Wi-Fi signals transmitted by network access points. Referring to FIG. 8C, the APs 806-1, 806-2, 806-3 are configured to exchange ranging messages such as the first and second NDP sounding packets 836, 838. The low power UE 854 may be configured to receive the NDP sounding packets 836, 838. The low powered UE's provide an efficient solution to contact tracing by reducing the messaging overhead utilized by multiple UEs that may actively join a Wi-Fi network.

At stage 1704, the method includes storing timestamp information and signal identification information for each of the one or more received wireless ranging signals in a local data structure. The low power UE 854 is a means for storing timestamp information and signal identification information. The low power UE 854 may be configured to receive the NDP sounding packets 836, 838 and store the receive TOA measurement information such as the time of arrival, MAC ID and other measurement data in a local memory. Other measurements may also be stored in the low power UE 854 based on the capabilities of the low power UE. In an example, the UE 200 may be configured as a low power UE 854. For example, the UE 200 may enter a partial sleep mode with such that the wireless transceiver 240 is set to a reduce power receive mode configured to store the received NDP packet information.

At stage 1706, the method includes transferring the time-stamp information and the signal identification information stored in the local data structure to a remote data structure via a second radio access technology. The low power UE 854 is a means for transferring timestamp information and the signal identification information. In an example, the low power UE 854 may utilize a reader 862 to capture the data stored in the low power UE 854 when the low power UE 854 is within the detectable area of the reader 862. The reader 862 may utilize a second radio access technology to obtain the timestamp information and the signal identification information. The second radio access technology may be a non-Wi-Fi radio such as an amplitude modulation (AM) at a lower frequency (e.g., less than 125 kHz). Other radio access technologies may be used to transfer data from a low power UE. For example, a low power UE may utilize Bluetooth or other sidelink connections to transfer data to a data structure.

Referring to FIG. 18, with further reference to FIGS. 1-14, a method 1800 of determining contact tracing incidents includes the stages shown. The method 1800 is, however, an example only and not limiting. The method 1800 may be altered, e.g., by having stages added, removed, rearranged, combined, performed concurrently, and/or having single stages split into multiple stages.

At stage 1802, the method includes receiving relative location information for a plurality of client devices from one or more stations. The server 400 is a means for receiving relative location information. In an example, network stations such as the APs 806-1, 806-2, 806-3 are configured to perform ranging sessions 812, 814 and may provide AP-based location estimation information based on RTT and/or AoA techniques. Referring to FIG. SA, the UEs 802, 804 are measured with different APs (e.g., the first and third APs 806-1, 806-3), the APs report their respective RTT and/or AoA measurements. For example, the location server 808 may receive RTT and/or AoA measurements associated with the UEs 802, 804, wherein the measurements are obtained within a narrow time window (e.g., 1, 5, 10, 30, seconds). In an embodiment, passive positioning techniques may be used such that the UEs may not be associated with the APs but may be configured to detect ranging measurements exchanged between the APs (e.g., NDP packets). The UEs 802, 804 may be configured to provide the TOA and station information (e.g., MAC ID) to the location server 808 via another radio access technology. For example, the UEs 802, 804 may be configured to utilize a cellular communication network (e.g., the communication system 100) to provide the passive positioning measurements. In another example, the UEs 802, 804 may utilize a reader 862 or other kiosk to transfer the passive positioning measurements (e.g., via Bluetooth, sidelink, or other radio access technology).

At stage 1804, the method includes determining distances between the plurality of client devices based at least in part on the relative location information and locations for each of the one or more stations. The location server 808 is a means for determining the distances between client devices. The relative location information may be based on the active and/or passive measurements obtained at stage 1802 (e.g., TOA, AoA, TDOA, RTT, RSSI, etc.). In an example, the location server 808 may utilize positioning formulas for active and/or passive positioning as known in the art to determine the locations between the users 802a, 804a based on the received measurements.

At stage 1806, the method includes detecting a contact tracing incident based at least in part on the distances between the plurality of client devices. The location server 808 is a means for detecting contact tracing incidents. In an example, a social distancing guideline may establish a contact range 706 and the location server 808 may utilize the contact range 706 to determine if two client devices may be classified as a contact tracing incident. The contact range 706 may be based on a user configuration option (e.g., a social distance threshold field). A contact time threshold value may also be applied to further constrain the data based on a minimum amount of time the clients were concurrently within the social distance threshold distance. In an example, the location server 808 may include a data structure to capture the client location information and detecting the contact tracing incidents may include querying the data structure based on the social distance threshold and option-ally the contact time duration value. Other parameters, such as the presence of a barrier, location context (e.g., indoor, outdoor), environmental conditions (e.g., wind), may be used to determine a contact tracing incident. For example, a barrier may negate a contact incident and an outdoor loca-tion may extend the social distance requirement.

At stage 1808, the method includes providing an indica-tion of the contact tracing incident to one or more of the plurality of client devices. The location server 808 is a means for providing the indication of the contact tracing incident. In an example, the location server 808 may utilize the Wi-Fi network, or the communication system 100, to provide a near real time alert to the two or more client devices which triggered the contact tracing event. The alert may be in the form of a text message, notification, or other alert object based on the capabilities of the client devices. In an example, the indication may be in the form of a summary report at the conclusion of an event, or other time period to notify the user of potential contact incidents during the time period. The indication may be based on a reported case of the contagion by a user, such that the location server 808 may be configured to alert only the users that were involved in contact tracing incidents with the infected user.

Referring to FIG. 19, with further reference to FIGS. 1-14, a method 1900 for providing contact history informa-tion to a user includes the stages shown. The method 1900 is, however, an example only and not limiting. The method 1900 may be altered, e.g., by having stages added, removed, rearranged, combined, performed concurrently, and/or hav-ing single stages split into multiple stages.

At stage 1902, the method includes receiving one or more contact tracing configuration options associated with a client device. The location server 908 and/or the AP 906 are a means for receiving the contact tracing information. In an example, the UE 902 may be associated with a Wi-Fi network and may be configured to provide contact tracing configuration options such as the fields in the configuration table 1406 to the location server. In an example, the UE 1002 may utilize the communication system 1008 (e.g., a cellular network such as the communication system 100) to provide the contact tracing configuration options. The configuration options may be associated with a particular location such as a restaurant, shopping area, public building, or other entities.

At stage 1904, the method includes determining contact history information based at least in part on the one or more contact tracing configuration options. The location server 908 and/or the AP 906 are a means for determining contact history information. In an example, the location server 908 is configured to obtain and process UE position measurements such as described in FIGS. 8A-8C for one or more Wi-Fi networks. The contact history information may include location information for UEs currently at the location(s) associated with the Wi-Fi network(s). In an example, the contact history information may be records in a contact trace table 1404 stored on a location server or AP. The records in the contact trace table may be obtained an analyzed based on the values in the configuration table 1406. For example, the social distancing threshold and contact time threshold, and the clustering parameters may be used to query and/or filter the contact trace records to generate the contact trace history information. Other operations and functions may also be used to select records from the contact trace table 1404.

At stage 1906, the method include providing the contact history information to the client device. The location server 908 and/or the AP 906 are means for providing the contact history information. In an example, referring to FIG. 9, the AP 906 may provide the contact history information to the UE 902 via the Wi-Fi network. In an example, referring to FIG. 10, the server 1010 may be configured to provide the contact history information to the UE 1002 via the communication system 1008. Other radio access technologies, such as Bluetooth and sidelink interfaces may also be used to provide the contact history information to a client.

Other examples and implementations are within the scope of the disclosure and appended claims. For example, due to the nature of software and computers, functions described above can be implemented using software executed by a processor, hardware, firmware, hardwiring, or a combination of any of these. Components, functional or otherwise, shown in the figures and/or discussed herein as being connected or communicating with each other are communicatively coupled unless otherwise noted. That is, they may be directly or indirectly connected to enable communication between them. Features implementing functions may also be physically located at various positions, including being distributed such that portions of functions are implemented at different physical locations. For example, one or more functions, or one or more portions thereof, discussed above as occurring in the location server may be performed outside of the location such as by an AP.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers; steps, operations; elements, and/or components, but do not preclude the presence or addition of one or more other features, integers, steps, operations, elements, components, and/or groups thereof As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may, be combined in a similar manner. Also, technology evolves and, thus, many of the elements are examples and do not limit the scope of the disclosure or claims.

A wireless communication system is one in which communications are conveyed wirelessly, i.e., by, electromagnetic and/or acoustic waves propagating through atmospheric space rather than through a wire or other physical connection. A wireless communication network may not have all communications transmitted wirelessly, hut is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

1. A method for reporting signal measurements to a contact tracing network, comprising:

activating a contact tracing application on a user equipment based on a proximity to the contact tracing network;

receiving one or more measurement signals from a station in the contact acing network; and reporting a signal measurement and station identification to a network entity.

2. The method of clause 1 further comprising performing an association process between the user equipment and the station in the contact tracing network.

3. The method of clause 1 wherein the user equipment is a low power user equipment.

4. The method of clause 1 wherein the one or more measurement signals include one or more round trip time (RTT) messages transmitted between the station and the user equipment.

5. The method of clause 4 wherein the one or more round trip time (RTT) messages are Wi-Fi ranging frames including at least one of Fine Timing Measurement frames, NDP ranging frames, and TB ranging NDP frames.

6. The method of clause 1 wherein the one or more measurement signals include sounding packets transmitted between two or more stations in the contact tracing network.

7. The method of clause 1 wherein the one or more measurement signals are received via a first radio access technology and the reporting the signal measurement and station identification utilizes a second radio access technology.

8. The method of clause 7 wherein the first radio access technology is a Wi-Fi network, and the second radio access technology is a cellular network.

9. The method of clause 7 wherein the first radio access technology is a Wi-Fi network, and the second radio access technology is Bluetooth.

10. The method of clause 7 wherein the first radio access technology is a Wi-Fi network, and the second radio access technology utilizes a radio frequency identification band.

11. The method of clause 1 further comprising displaying a contact tracing verification screen when the contact tracing application is activated.

12. The method of clause 1 further comprising determining a received signal strength indication based on the one or more measurement signals, and reporting the received signal strength indication to the network entity.

13. The method of clause 1 further comprising receiving an angle of arrival indication based on the one or more measurement signals, and reporting the angle of arrival indication to the network entity.

14. A method for displaying a contact history map on a user equipment, comprising:

activating a contact tracing application on the user equipment;

providing one or more contact tracing configuration options to a contact tracing network;

receiving contact history information based at least in part on the one or more contact tracing configuration options; and displaying the contact history map based at least in part on the contact history information.

15. The method of clause 14 wherein providing the one or more contact tracing configuration options includes performing an association process with a station in the contact tracing network and providing the one or more contact tracing configuration options to the station.

16. The method of clause 15 wherein the contact history information is received from the station.

17. The method of clause 14 wherein the one or more contact tracing configuration options are provided to the contact tracing network via a cellular network, and the contact history information is received via the cellular network.

18. The method of clause 14 wherein the one or more contact tracing configuration options include one or more of a social distance threshold value, a contact time threshold value, a cluster range value, and a cluster time value.

19. The method of clause 14 wherein the contact history information includes a location information associated with user equipment currently detected by the contact tracing network, 20. The method of clause 14 wherein the contact history information includes a location information associated with user equipment previously detected by the contact tracing network.

21. The method of clause 14 wherein the contact history information includes one or more social distancing violation objects indicating an area covered by the contact tracing network where contact tracing incidents have occurred, 22. The method of clause 21 wherein the one or more social distancing violation objects include a count value indicating a number of contact tracing incidents that occurred the area.

23. The method of clause 14 wherein the one or more contact tracing configuration options include a validation code that is associated with the contact tracing network and required to receive the contact history information, 24. An apparatus, comprising:

a memory;

at least one receiver;

at least one transmitter;

at least one processor communicatively coupled to the memory, the at least one receiver, the at least one transmitter, and configured to:

activate a contact tracing application based on a proximity to a contact tracing network;

receive one or more measurement signals from a station in the contact tracing network; and report a signal measurement and station identification to a network entity.

25. The apparatus of clause 24 wherein the at least one processor is further configured to perform an association process between the apparatus and the station in the contact tracing network.

26. The apparatus of clause 24 wherein the apparatus is a low power user equipment.

27. The apparatus of clause 24 wherein the one or more measurement signals include one or more round trip time (RTT) messages transmitted to and received from the station.

28. The apparatus of clause 27 wherein the one or more round trip time (RTT) messages are Wi-Fi ranging frames including at least one of Fine Timing Measurement frames, NDP ranging frames, and TB ranging NDP frames.

29. The apparatus of clause 24 wherein the one or more measurement signals include sounding packets transmitted between two or more stations in the contact tracing network.

30. The apparatus of clause 24 wherein the one or more measurement signals are received via a first radio access technology and the reporting the signal measurement and station identification utilizes a second radio access technology.

31. The apparatus of clause 30 wherein the first radio access technology is a Wi-Fi network, and the second radio access technology is a cellular network.

32. The apparatus of clause 30 wherein the first radio access technology is a Wi-Fi network, and the second radio access technology is Bluetooth.

33. The apparatus of clause 30 wherein the first radio access technology is a Wi-Fi network, and the second radio access technology utilizes a radio frequency identification band.

34. The apparatus of clause 24 further comprising a display communicatively coupled to the at least one processor and the memory, wherein the at least one processor is configured to display a contact tracing verification screen when the contact tracing application is activated.

35. The apparatus of clause 24 wherein the at least one processor is further configured to determine a received signal strength indication based on the one or more measurement signals, and report the received signal strength indication to the network entity.

36, The apparatus of clause 24 wherein the at least one processor is further configured to receiving an angle of arrival indication based on the one or more measurement signals, and reporting the angle of arrival indication to the network entity.

37. An apparatus, comprising:
a memory;
a display device;
at least one transceiver;
at least one processor communicatively coupled to the memory, the display device, the at least one transceiver, and configured to:
activate a contact tracing application;
provide one or more contact tracing configuration options to a contact tracing network;
receive contact history information based at least in part on the one or more contact tracing configuration options; and
display a contact history map on the display device based at least in part on the contact history information.

38. The apparatus of clause 37 wherein the at least one processor is further configured perform an association process with a station in the contact tracing network and provide the one or more contact tracing configuration options to the station.

39. The apparatus of clause 38 wherein the at least one processor is configured to receive contact story information from the station.

40. The apparatus of clause 37 wherein the at least one processor is further configured to provide the one or more contact tracing configuration options to the contact tracing network via a cellular network, and receive the contact history information via the cellular network.

41. The apparatus of clause 37 wherein the one or more contact tracing configuration options include one or more of a social distance threshold value, a contact time threshold value, a cluster range value, and a duster time value.

42. The apparatus of clause 37 wherein the contact history information includes a location information associated with user equipment currently detected by the contact tracing network.

43, The apparatus of clause 37 wherein the contact history information includes a location information associated with user equipment previously detected by the contact tracing network.

44. The apparatus of clause 37 wherein the contact history information includes one or more social distancing violation objects indication an area covered by the contact tracing network where contact tracing incidents have occurred.

45. The apparatus of clause 44 wherein the one or more social distancing violation objects include a count value indicating a number of contact tracing incidents that occurred the area.

46. The apparatus of clause 37 wherein the one or more contact tracing configuration options include a validation code that is associated with the contact tracing network and required to receive the contact history information.

47. An apparatus for reporting signal measurements to a contact tracing network; comprising:
means for activating a contact tracing application on a user equipment based on a proximity to the contact tracing network;
means for receiving one or more measurement signals from a station in the contact tracing network; and
means for reporting a signal measurement and station identification to a network entity.

48. An apparatus for displaying a contact history map on a user equipment, comprising:
means for activating a contact tracing application on the user equipment;
means for providing one or more contact tracing configuration options to a contact tracing network;
means for receiving contact history information based at least in part on the one or more contact tracing configuration options; and
means for displaying the contact history map based at least in part on the contact history information.

49. A non-transitory processor-readable storage medium comprising processor-readable instructions configured to cause one or more processors to report signal measurements to a contact tracing network, comprising:
code for activating a contact tracing application on a user equipment based on a proximity to the contact tracing network;
code for receiving one or more measurement signals from a station in the contact tracing network; and
code for reporting a signal measurement and station identification to a network entity.

50. A non-transitory processor-readable storage medium comprising processor-readable instructions configured to cause one or more processors to display a contact history map on a user equipment, comprising:
code for activating a contact tracing application on the user equipment;
code for providing one or more contact tracing configuration options to a contact tracing network;
code for receiving contact history information based at least in part on the one or more contact tracing configuration options; and
code for displaying the contact history map based at least in part on the contact history information.

51. A method for providing contact tracing information with low power user equipment, comprising:
receiving one or more wireless ranging signals with a first radio access technology;
storing timestamp information and signal identification information for each of the one or more received wireless ranging signals in a local data structure; and transferring the timestamp information and the signal identification information stored in the local data structure to a remote data structure via a second radio access technology.

52. A method for determining contact tracing incidents, comprising:

receiving relative location information for a plurality of client devices from one or more stations;

determining distances between the plurality of client devices based at least in part on the relative location information and locations for each of the one or more stations:

detecting a contact tracing incident based at least in part on the distances between the plurality of client devices; and providing an indication of the contact tracing incident to one or more of the plurality of client devices.

53. A method for providing contact history information to a cheat device, comprising:

receiving one or more contact tracing configuration options associated with the client device;

determining contact history information based at least in part on the one or more contact tracing configuration options; and providing the contact history information to the client device.

The invention claimed is:

1. A method for reporting signal measurements to a contact tracing network, comprising:

activating a contact tracing application on a user equipment based on a proximity to the contact tracing network;

receiving one or more measurement signals from a station in the contact tracing network; and reporting a signal measurement and station identification to a network entity;

wherein the one or more measurement signals include one or more round trip time RTT) messages transmitted between the station and the user equipment, and the one or more RTT messages are one or more Wi-Fi ranging frames including at least one of one or more Fine Timing Measurement frames, one or more Ranging Null Data (NDP) ranging frames, and one or more Trigger Based (TB) ranging NDP frames.

2. The method of claim 1 further comprising performing an association process between the user equipment and the station in the contact tracing network.

3. The method of claim 1 wherein the user equipment is a low power user equipment.

4. The method of claim 1 wherein the one or more measurement signals include sounding packets transmitted between two or more stations in the contact tracing network.

5. The method of claim 1 wherein the one or more measurement signals are received via a first radio access technology and the reporting the signal measurement and station identification utilizes a second radio access technology.

6. The method of claim 5 wherein the first radio access technology is a Wi-Fi network, and the second radio access technology is a cellular network.

7. The method of claim 5 wherein the first radio access technology is a Wi-Fi network, and the second radio access technology is Bluetooth.

8. The method of claim 5 wherein the first radio access technology is a Wi-Fi network, and the second radio access technology utilizes a radio frequency identification band.

9. The method of claim 1 further comprising determining a received signal strength indication based on the one or more measurement signals, and reporting the received signal strength indication to the network entity.

10. The method of claim 1 further comprising receiving an angle of arrival indication based on the one or more measurement signals, and reporting the angle of arrival indication to the network entity.

11. The method of claim 1 wherein the means for receiving are for receiving the one or more measurement signals using a first radio access technology and the means for reporting are for reporting the signal measurement and station identification using a second radio access technology.

12. A method for reporting signal measurements to a contact tracing network, comprising:

activating a contact tracing application on a user equipment based on a proximity to the contact tracing network;

receiving one or more measurement signals from a station in the contact tracing network;

reporting a signal measurement and station identification to a network entity; and displaying a contact tracing verification screen when the contact tracing application is activated.

13. An apparatus, comprising:

a memory;

at least one receiver;

at least one transmitter;

at least one processor communicatively coupled to the memory, the at least one receiver, the at least one transmitter, and configured to:

activate a contact tracing application based on a proximity to a contact tracing network;

receive one or more measurement signals from a station in the contact tracing network; and report a signal measurement and station identification to a network entity;

wherein the one or more measurement signals include one or more round trip time RTT) messages transmitted between the station and the user equipment, and the one or more RTT messages are one or more Wi-Fi ranging frames including at least one of one or more Fine Timing Measurement frames, one or more Ranging Null Data (NDP) ranging frames, and one or more Trigger Based (TB) ranging NDP frames.

14. The apparatus of claim 13 wherein the one or more measurement signals include sounding packets transmitted between two or more stations in the contact tracing network.

15. The apparatus of claim 13 wherein the at least one processor is configured to receive the one or more measurement signals via the at least one receiver using a first radio access technology and the at least one processor is configured to report the signal measurement and station identification via the at least one transmitter using a second radio access technology.

16. The apparatus of claim 13 wherein the at least one processor is further configured to determine a received signal strength indication based on the one or more measurement signals, and report the received signal strength indication to the network entity.

17. The apparatus of claim 13 wherein the at least one processor is further configured to receive an angle of arrival indication based on the one or more measurement signals, and to report the angle of arrival indication to the network entity.

18. The apparatus of claim 13 wherein the at least one processor is further configured to perform an association process between the apparatus and the station in the contact tracing network.

19. An apparatus, comprising:

a memory;

at least one receiver;

at least one transmitter;

at least one processor communicatively coupled to the memory, the at least one receiver, the at least one transmitter, and configured to:

activate a contact tracing application based on a proximity to a contact tracing network;

receive one or more measurement signals from a station in the contact tracing network;

report a signal measurement and station identification to a network entity; and a display communicatively coupled to the at least one processor and the memory, wherein the at least one processor is configured to display a contact tracing verification screen when the contact tracing application is activated.

20. An apparatus for reporting signal measurements to a contact tracing network, comprising:

means for activating a contact tracing application on a user equipment based on a proximity to the contact tracing network;

means for receiving one or more measurement signals from a station in the contact tracing network; and means for reporting a signal measurement and station identification to a network entity;

wherein the one or more measurement signals include one or more round trip time RTT) messages transmitted between the station and the user equipment, and the one or more RTT messages are one or more Wi-Fi ranging frames including at least one of one or more Fine Timing Measurement frames, one or more Ranging Null Data (NDP) ranging frames, and one or more Trigger Based (TB) ranging NDP frames.

21. The apparatus of claim 20 further comprising performing an association process between the user equipment and the station in the contact tracing network.

22. The apparatus of claim 20 wherein the one or more measurement signals include sounding packets transmitted between two or more stations in the contact tracing network.

23. The apparatus of claim 20 further comprising means for determining a received signal strength indication based on the one or more measurement signals, and means for reporting the received signal strength indication to the network entity.

24. The apparatus of claim 20 further comprising means for receiving an angle of arrival indication based on the one or more measurement signals, and means for reporting the angle of arrival indication to the network entity.

25. An apparatus for reporting signal measurements to a contact tracing network, comprising:

means for activating a contact tracing application on a user equipment based on a proximity to the contact tracing network;

means for receiving one or more measurement signals from a station in the contact tracing network;

means for reporting a signal measurement and station identification to a network entity; and means for displaying a contact tracing verification screen when the contact tracing application is activated.

26. A non-transitory processor-readable storage medium comprising processor-readable instructions configured to cause one or more processors to report signal measurements to a contact tracing network, comprising:

code for activating a contact tracing application on a user equipment based on a proximity to the contact tracing network;

code for receiving one or more measurement signals from a station in the contact tracing network; and code for reporting a signal measurement and station identification to a network entity;

wherein the one or more measurement signals include one or more round trip time (RTT) messages transmitted between the station and the user equipment, and the one or more RTT messages are one or more Wi-Fi ranging frames including at least one of one or more Fine Timing Measurement frames, one or more Ranging Null Data (NDP) ranging frames, and one or more Trigger Based (TB) ranging NDP frames.

\* \* \* \* \*